(12) United States Patent
Nosler et al.

(10) Patent No.: US 7,673,555 B2
(45) Date of Patent: Mar. 9, 2010

(54) MACHINE FOR BREWING A BEVERAGE SUCH AS COFFEE AND RELATED METHOD

(75) Inventors: Zander Nosler, Seattle, WA (US); Randy Hulett, Seattle, WA (US); Mike Baum, Seattle, WA (US); Izaak Koller, Seattle, WA (US); Brian Shay, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 343 days.

(21) Appl. No.: 11/525,251

(22) Filed: Sep. 20, 2006

(65) Prior Publication Data

US 2007/0068393 A1    Mar. 29, 2007

Related U.S. Application Data

(60) Provisional application No. 60/670,955, filed on Apr. 11, 2005, provisional application No. 60/719,069, filed on Sep. 20, 2005, provisional application No. 60/790,417, filed on Apr. 6, 2006.

(51) Int. Cl.
*A47J 31/00* (2006.01)
*A23F 5/00* (2006.01)

(52) U.S. Cl. .......................... 99/279; 99/289 R; 99/297; 99/299; 99/287; 99/283; 426/433

(58) Field of Classification Search ............... 99/289 R, 99/279, 297, 299, 287, 283; 426/433
See application file for complete search history.

(56) References Cited

U.S. PATENT DOCUMENTS 4,237,536 A    12/1980    Enelow et al.

(Continued)

FOREIGN PATENT DOCUMENTS

BE    875008    9/1979

(Continued)

OTHER PUBLICATIONS

International Search Report for PCT/US2006/036844 mailed Jan. 15, 2007.

(Continued)

*Primary Examiner*—Shawntina Fuqua
(74) *Attorney, Agent, or Firm*—Knobbe, Martens, Olson & Bear, LLP

(57) ABSTRACT

An embodiment of a machine for brewing a beverage such as coffee includes a chamber and a piston assembly disposed in the chamber. The chamber is operable to receive a liquid such as water and a flavor base such as ground coffee, and to allow the beverage to brew from a mixture of the liquid and the base. The piston assembly is operable to filter a solid such as spent coffee grounds from the brewed beverage by moving in a first direction, and to force the filtered beverage out of the chamber by moving in a second direction. By modifying or automating some or all steps of the French press brewing technique, such a machine may control one or more of the brewing parameters with a level of precision that yields brewed coffee having a uniform taste from cup to cup. Furthermore, such a machine may brew the coffee with a speed that renders the machine suitable for use by establishments that serve significant amounts of coffee.

46 Claims, 7 Drawing Sheets

U.S. PATENT DOCUMENTS

| | | |
|---|---|---|
| 4,278,186 A | 7/1981 | Williamson |
| 4,328,740 A | 5/1982 | McDonough et al. |
| 4,468,406 A | 8/1984 | d'Alayer de Costemore d'Arc |
| 4,595,131 A | 6/1986 | Raskin et al. |
| 4,653,389 A | 3/1987 | Hayes |
| 4,766,548 A | 8/1988 | Cedrone et al. |
| 4,790,239 A | 12/1988 | Hewitt |
| 4,797,296 A | 1/1989 | Meier et al. |
| 4,798,222 A | 1/1989 | Kauffman |
| 4,801,375 A | 1/1989 | Padilla |
| 4,817,044 A | 3/1989 | Ogren |
| 4,833,979 A | 5/1989 | Garulli et al. |
| 4,853,684 A | 8/1989 | Hoppstadter |
| 4,873,916 A | 10/1989 | Piscaer |
| 4,888,466 A | 12/1989 | Hoffmann |
| 4,944,217 A | 7/1990 | Watanabe |
| 4,949,257 A | 8/1990 | Orbach |
| 4,983,412 A | 1/1991 | Hauslein |
| 5,072,660 A | 12/1991 | Helbling |
| 5,091,713 A | 2/1992 | Horne et al. |
| 5,139,127 A | 8/1992 | Ficken et al. |
| 5,144,886 A | 9/1992 | Gockelmann et al. |
| 5,146,839 A | 9/1992 | Gockelmann et al. |
| 5,153,016 A | 10/1992 | Gockelmann et al. |
| 5,183,998 A | 2/1993 | Hoffman et al. |
| 5,192,000 A | 3/1993 | Wandrick et al. |
| 5,203,366 A | 4/1993 | Czeck et al. |
| 5,207,148 A | 5/1993 | Anderson et al. |
| 5,230,278 A | 7/1993 | Bunn et al. |
| 5,255,593 A | 10/1993 | Bunn et al. |
| 5,259,296 A | 11/1993 | Mikael et al. |
| 5,299,135 A | 3/1994 | Lieto et al. |
| 5,375,508 A | 12/1994 | Knepler et al. |
| 5,404,794 A | 4/1995 | Patel et al. |
| 5,406,882 A | 4/1995 | Shaanan |
| 5,465,649 A | 11/1995 | Muis |
| 5,495,793 A | 3/1996 | Muis et al. |
| 5,542,342 A | 8/1996 | McNeill et al. |
| 5,590,288 A | 12/1996 | Castor et al. |
| 5,612,890 A | 3/1997 | Strasser et al. |
| 5,622,099 A | 4/1997 | Frei |
| 5,623,864 A | 4/1997 | Moore et al. |
| 5,629,863 A | 5/1997 | Palozzi et al. |
| 5,644,972 A | 7/1997 | Dahmen et al. |
| 5,659,482 A | 8/1997 | Carr |
| 5,694,115 A | 12/1997 | Desatoff |
| 5,823,096 A | 10/1998 | Shih |
| 5,911,810 A | 6/1999 | Kawabata |
| 5,913,180 A | 6/1999 | Ryan |
| 5,913,454 A | 6/1999 | McHale |
| 5,913,963 A | 6/1999 | King |
| 5,930,771 A | 7/1999 | Stapp |
| 5,939,974 A | 8/1999 | Heagle et al. |
| 5,941,363 A | 8/1999 | Partyka et al. |
| 5,967,367 A | 10/1999 | Orsborn |
| 5,979,299 A | 11/1999 | Hornsby et al. |
| 6,056,194 A | 5/2000 | Kolls |
| 6,098,525 A | 8/2000 | Gijzel et al. |
| 6,115,649 A | 9/2000 | Sakata |
| 6,116,147 A | 9/2000 | Schmed |
| 6,127,185 A | 10/2000 | Melton et al. |
| 6,135,010 A | 10/2000 | Hasted et al. |
| 6,181,981 B1 | 1/2001 | Varga et al. |
| 6,182,555 B1 | 2/2001 | Scheer et al. |
| 6,192,737 B1 | 2/2001 | Ohlrogge et al. |
| 6,234,354 B1 | 5/2001 | Phillips et al. |
| 6,240,833 B1 | 6/2001 | Sham et al. |
| 6,253,664 B1 | 7/2001 | Giannelli |
| 6,305,268 B1 | 10/2001 | Schamberg et al. |
| 6,324,966 B1 | 12/2001 | Joergensen |
| 6,324,967 B1 | 12/2001 | Robinson |
| 6,351,688 B1 | 2/2002 | Nichols et al. |
| 6,382,083 B2 | 5/2002 | Schmed |
| 6,391,360 B1 | 5/2002 | Stettes et al. |
| 6,401,729 B1 | 6/2002 | Ford |
| 6,431,055 B2 | 8/2002 | Bonanno |
| 6,435,406 B1 | 8/2002 | Pentel |
| 6,460,735 B1 | 10/2002 | Greenwald et al. |
| 6,513,419 B2 | 2/2003 | Huber et al. |
| 6,526,872 B2 | 3/2003 | Wong |
| 6,550,642 B2 | 4/2003 | Newman et al. |
| 6,564,697 B2 | 5/2003 | Maxwell et al. |
| 6,595,107 B2 | 7/2003 | Hart et al. |
| 6,600,969 B2 | 7/2003 | Sudolcan et al. |
| 6,606,937 B2 | 8/2003 | Lassota |
| 6,612,224 B2 | 9/2003 | Mercier et al. |
| 6,628,764 B1 | 9/2003 | Petite |
| 6,659,048 B1 | 12/2003 | DeSantis et al. |
| 6,672,200 B2 | 1/2004 | Duffy et al. |
| 6,684,756 B2 | 2/2004 | Kerr |
| 6,688,134 B2 | 2/2004 | Barton et al. |
| 6,705,208 B2 | 3/2004 | Lassota |
| 6,734,878 B1 | 5/2004 | DeLuca et al. |
| 6,739,240 B2 | 5/2004 | De Jong et al. |
| 6,742,553 B2 | 6/2004 | Sato et al. |
| 6,745,668 B2 | 6/2004 | Levi et al. |
| 6,752,069 B1 | 6/2004 | Burke et al. |
| 6,759,072 B1 | 7/2004 | Gutwein et al. |
| 6,807,898 B2 | 10/2004 | De Koning et al. |
| 6,817,280 B2 | 11/2004 | Hall et al. |
| 6,819,976 B2 | 11/2004 | Kimura |
| 6,821,541 B2 | 11/2004 | Lee |
| 6,834,317 B2 | 12/2004 | Chadwell et al. |
| 6,842,721 B2 | 1/2005 | Kim et al. |
| 6,853,958 B1 | 2/2005 | Turin et al. |
| 6,857,352 B2 | 2/2005 | Fischer |
| 6,857,354 B2 | 2/2005 | Reyhanloo |
| 6,880,750 B2 | 4/2005 | Pentel |
| 6,915,732 B2 | 7/2005 | Jones et al. |
| 6,934,602 B2 | 8/2005 | Sudolcan et al. |
| 6,945,014 B1 | 9/2005 | Quann |
| 6,958,693 B2 | 10/2005 | Rothgeb et al. |
| 6,964,223 B2 | 11/2005 | O'Loughlin |
| 7,013,337 B2 | 3/2006 | Defosse et al. |
| 7,021,197 B2 | 4/2006 | Chen et al. |
| 7,024,984 B2 | 4/2006 | Leung et al. |
| 7,066,079 B2 | 6/2006 | Sager |
| 7,151,968 B2 | 12/2006 | Williamson |
| 7,158,918 B2 | 1/2007 | Bunn et al. |
| 7,162,391 B2 | 1/2007 | Knepler et al. |
| 7,197,377 B2 | 3/2007 | Knepler et al. |
| 7,204,259 B2 | 4/2007 | Crisp |
| 7,223,427 B2 | 5/2007 | Knepler |
| 7,234,389 B1 | 6/2007 | Lassota |
| 7,268,698 B2 | 9/2007 | Hart et al. |
| 7,387,239 B2 | 6/2008 | Thomas et al. |
| 7,437,990 B2 | 10/2008 | Duch |
| 7,440,817 B2 | 10/2008 | Fu |
| 7,481,152 B2 | 1/2009 | Steckhan et al. |
| 7,555,979 B2 | 7/2009 | Shultis |
| 2002/0130136 A1 | 9/2002 | Segal |
| 2003/0066430 A1 | 4/2003 | Bitar et al. |
| 2003/0070555 A1 | 4/2003 | Reyhanloo |
| 2003/0070979 A1 | 4/2003 | Huang |
| 2003/0074106 A1 | 4/2003 | Butler |
| 2003/0079612 A1 | 5/2003 | Con |
| 2003/0166400 A1 | 9/2003 | Lucas |
| 2003/0198465 A1 | 10/2003 | Cai |
| 2003/0208419 A1 | 11/2003 | Bunn |
| 2004/0065208 A1 | 4/2004 | Hart et al. |
| 2004/0129144 A1 | 7/2004 | Beadle |
| 2004/0172161 A1 | 9/2004 | Sadakata et al. |
| 2004/0195263 A1 | 10/2004 | Lassota |
| 2004/0200357 A1 | 10/2004 | Wang |

| | | |
|---|---|---|
| 2005/0043855 A1 | 2/2005 | Kimura |
| 2005/0061837 A1 | 3/2005 | Sudolcan et al. |
| 2005/0109214 A1 | 5/2005 | Bruttin et al. |
| 2005/0166761 A1 | 8/2005 | Jones et al. |
| 2005/0172818 A1 | 8/2005 | Hunt et al. |
| 2005/0188854 A1 | 9/2005 | Green et al. |
| 2005/0199129 A1* | 9/2005 | Glucksman et al. ........... 99/279 |
| 2006/0065128 A1 | 3/2006 | Lu |
| 2006/0090652 A1 | 5/2006 | Greiwe |
| 2006/0117960 A1 | 6/2006 | Fischer |
| 2006/0149415 A1 | 7/2006 | Richards |
| 2006/0167743 A1 | 7/2006 | Bunn |
| 2006/0173576 A1 | 8/2006 | Goerg et al. |
| 2006/0200271 A1 | 9/2006 | Porco |
| 2006/0238346 A1 | 10/2006 | Teller |
| 2006/0254428 A1 | 11/2006 | Glucksman et al. |
| 2006/0277101 A1 | 12/2006 | Bunn |
| 2006/0278091 A1 | 12/2006 | Rutigliano |
| 2007/0028779 A1 | 2/2007 | Pigliacampo et al. |
| 2007/0119308 A1 | 5/2007 | Glucksman et al. |
| 2007/0138262 A1 | 6/2007 | Lai |
| 2007/0170249 A1 | 7/2007 | Rademacher |
| 2007/0187425 A1 | 8/2007 | Knepler |
| 2007/0296608 A1 | 12/2007 | Hart et al. |
| 2008/0000358 A1 | 1/2008 | Goeckner et al. |
| 2008/0095903 A1 | 4/2008 | Weijers |
| 2008/0148956 A1 | 6/2008 | Maurer |
| 2008/0178743 A1 | 7/2008 | Hug |
| 2008/0190297 A1 | 8/2008 | Gussmann |
| 2008/0195252 A1 | 8/2008 | Innocenti et al. |
| 2008/0202345 A1 | 8/2008 | Delonghi |
| 2008/0264266 A1 | 10/2008 | Carbonini |
| 2008/0269947 A1 | 10/2008 | Beane et al. |
| 2009/0136639 A1 | 5/2009 | Majer |
| 2009/0152345 A1 | 6/2009 | Johnson |

FOREIGN PATENT DOCUMENTS

| | | |
|---|---|---|
| DE | 32 33 085 A1 | 3/1984 |
| DE | 29915025 U1 | 1/2000 |
| EP | 0000685 B1 | 9/1982 |
| EP | 0473289 | 3/1992 |
| EP | 0885582 A1 | 12/1998 |
| EP | 1306040 A1 | 5/2003 |
| EP | 0993800 A1 | 12/2003 |
| FR | 2651664 | 3/1991 |
| JP | 11009461 | 1/1999 |
| RU | 2086169 | 8/1997 |
| SU | 1711806 | 2/1992 |
| WO | WO 03/101264 A | 12/2003 |

OTHER PUBLICATIONS

Patent Office of the Russian Federation, Decision on Grant, Nov. 9, 2009, pp. 1-9.

* cited by examiner

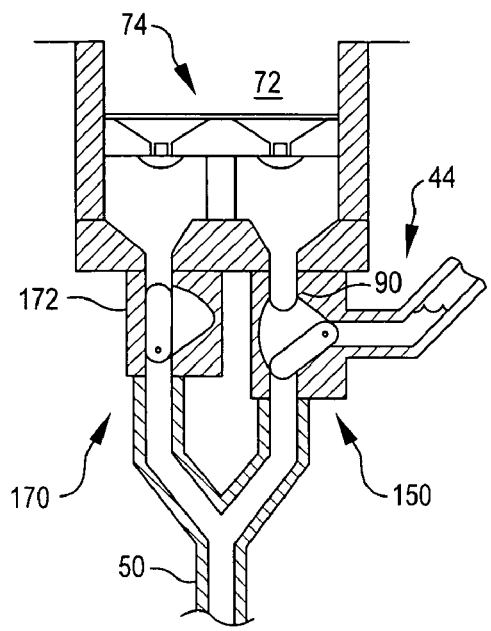
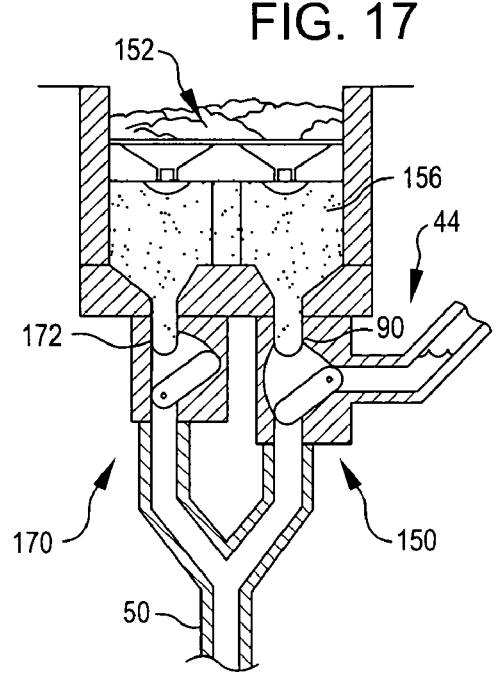
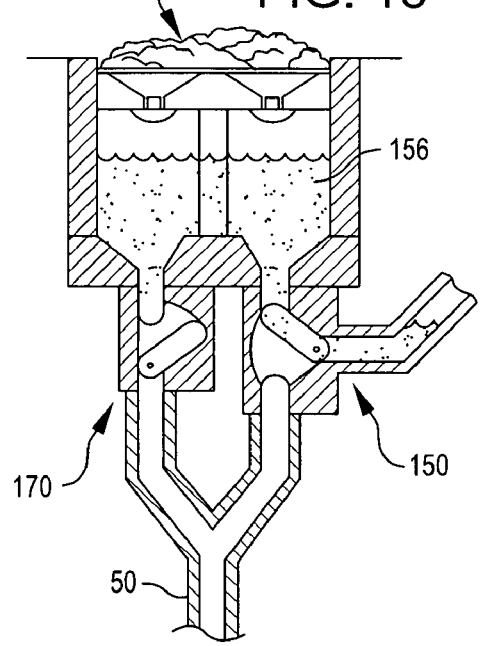
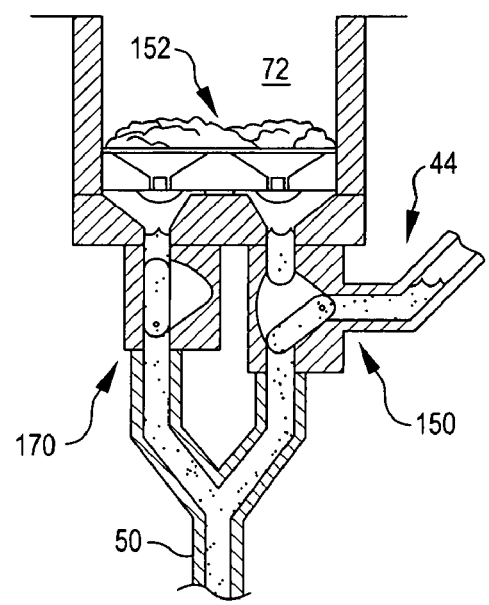

MACHINE FOR BREWING A BEVERAGE SUCH AS COFFEE AND RELATED METHOD

CLAIM OF PRIORITY

This application claims priority to U.S. Provisional Application Ser. Nos. 60/670,955 filed on Apr. 11, 2005, 60/719,069 filed on Sep. 20, 2005, and 60/790,417 filed on Apr. 6, 2006. This application also claims priority to International Application No. PCT/US2006/013930 filed on Apr. 11, 2006, and U.S. Design Application Ser. Nos. 29/257,647 filed on Apr. 6, 2006, and 29/257,662, filed on Apr. 6, 2006. All of the above applications are incorporated by reference.

BACKGROUND

Of the many techniques for brewing coffee, connoisseurs consider the French press technique to be one of the best for taste and efficient use of ground coffee (efficiency is proportional to the ratio of the amount of coffee brewed to the amount of ground coffee used). It is theorized that the good taste and efficiency is a result of the relatively thorough wetting of the coffee grounds that the French press technique allows. Wetting is a function of the surface area of the coffee grounds in contact with water during the brewing time, and of the portion of the brewing time during which this contact occurs. The greater the contact area and contact time, the more thorough the wetting of the coffee grounds.

Referring to FIGS. 1 and 2, the French press technique is described.

Referring to FIG. 1, one places ground coffee 10 and hot water 12 in a coffee container 14, and allows coffee to brew. Because the ground coffee 10 often floats to the surface of the water 12, one may stir or otherwise agitate the mixture of the ground coffee and the water to more thoroughly wet the individual coffee grounds that constitute the ground coffee.

Referring to FIG. 2, after the coffee 15 has brewed, one grasps a handle 16 of a filter 18, inserts the filter into the coffee container 14, and presses the filter down toward the bottom of the pot. For the taste of the brewed coffee to be relatively uniform from container to container, one typically uses and manually monitors a timer to measure the brew time.

Because the filter 18 passes liquid but does not pass coffee-ground-sized particles, as one presses the filter toward the bottom of the coffee container 14, the substantially ground-free brewed coffee 15 fills the portion of the container above the filter while the filter retains the ground coffee 10 in the portion of the container below the filter. Of course the edge 20 of the filter 18 and the inner side 22 of the container 14 form a seal sufficient to prevent coffee grounds from passing between the edge of the filter and the inner side of the container.

After one presses the filter 18 below a spout 24 of the coffee container 14, he can pour the substantially ground-free brewed coffee 15 into a cup (not shown in FIGS. 1 and 2) via the spout. Although one may stop pressing the filter 18 after the filter is below the spout 24, one typically presses the filter all the way to the bottom of the coffee container 14 to reduce the chances of undersized coffee grounds passing through the filter and into the cup.

Still referring to FIG. 2, after one pours the desired amount of brewed coffee 15, he retracts the filter 18 from the container 14 by pulling on the handle 16, removes the ground coffee 10 from the container, and then cleans the filter and the container.

Unfortunately, a problem with the above-described French press technique is that it is often too time consuming and too difficult for use by establishments, such as coffee shops, restaurants, and work places that serve significant amounts of coffee. The taste of brewed coffee typically depends on the brew parameters, which include the size of the coffee grounds (i.e., the grind size or consistency), the water temperature, the ratio of ground coffee to water, and the brew time. Even a slight variation in one of the brew parameters may cause a noticeable change in the taste of the brewed coffee. Because one typically controls at least some of the French press brewing parameters manually using equipment not shown in FIGS. 1-2 (e.g., coffee grinder, timer, thermometer, measuring cup), it is often difficult or time consuming to control all of these brewing parameters, particularly with the level of precision required to brew many containers of coffee having a substantially uniform taste from container to container. And because each cup of brewed coffee poured from the same container typically "sat" in the container for a different length of time, the taste of the brewed coffee may even change significantly from cup to cup.

SUMMARY

An embodiment of a machine for brewing a beverage such as coffee includes a chamber and a piston assembly disposed in the chamber. The chamber is operable to receive a liquid such as water and a flavor base such as ground coffee, and to allow the beverage to brew from a mixture of the liquid and the base. The piston assembly is operable to filter a solid such as spent coffee grounds from the brewed beverage by moving in a first direction, and to force the filtered beverage out of the chamber by moving in a second direction.

By modifying or automating some or all steps of the French press brewing technique, such a machine may control one or more of the brewing parameters with a level of precision that yields brewed coffee having a uniform taste from cup to cup. Furthermore, such a machine may brew the coffee with a speed that renders the machine suitable for use by establishments that serve significant amounts of coffee. In addition, such a machine may allow one to easily change the brewing recipe from cup to cup, where the recipe may be customized for a particular coffee varietal or to the preference of a particular customer. Other advantages of such a machine include freshness (the coffee is made to order and doesn't sit), selection (because the machine can brew coffee one cup at a time, one's selection is not limited to pre-brewed/batch-brewed coffee that the coffee shop prepared in advance), speed (one embodiment of the machine brews coffee in approximately ¼ the time of competing technologies), and cleanability (one embodiment of the machine may be cleaned relatively quickly and easily after each cup).

BRIEF DESCRIPTION OF THE DRAWINGS

FIGS. 16-19 illustrate a brewing cycle of the beverage-brewing machine of FIG. 3 according to another embodiment of the invention.

DETAILED DESCRIPTION

The following discussion is presented to enable a person skilled in the art to make and use one or more embodiments of the invention. The general principles described herein may be applied to embodiments and applications other than those detailed below without departing from the spirit and scope of the invention. Therefore the present invention is not intended to be limited to the embodiments shown, but is to be accorded the widest scope consistent with the principles and features disclosed or suggested herein.

Figure 1:
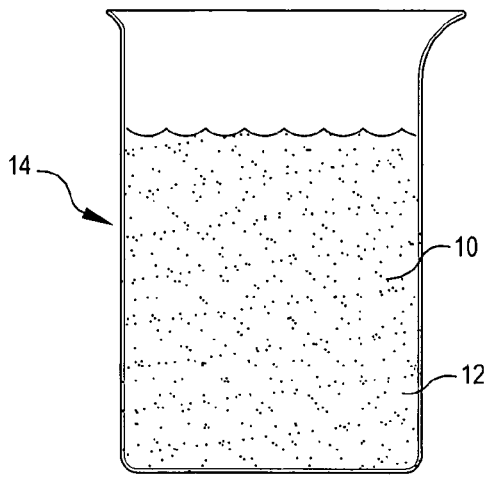
FIGS. 1-2 illustrate a conventional French press technique for brewing coffee.
Figure 2:
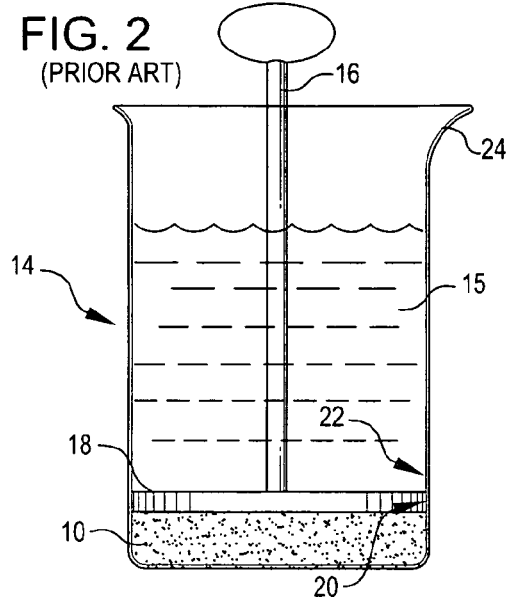
Figure 3:
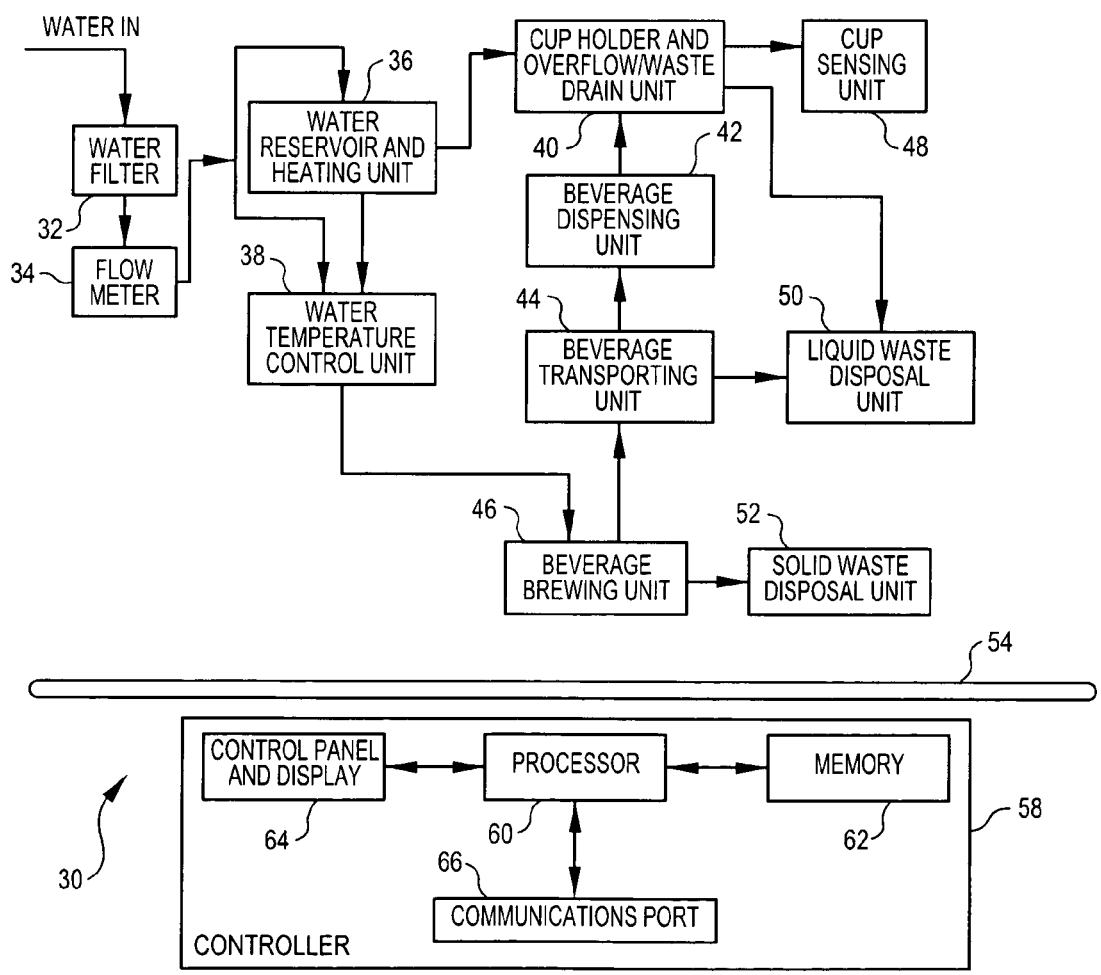
FIG. 3 is a block diagram of a machine for brewing a beverage such as coffee according to an embodiment of the invention.

FIG. 3 is a block diagram of a machine 30 for brewing a beverage according to an embodiment of the invention. The beverage-brewing machine 30 can brew coffee one cup at a time using a modified and partially to fully automated French press technique, which allows the machine to brew coffee more quickly and more uniformly from cup to cup than can a human operator performing the conventional French press technique described above in conjunction with FIGS. 1-2. Consequently, the machine 30 is often more suitable for establishments that brew and serve significant amounts of coffee than is a human operator performing the conventional French press technique.

The machine 30 includes the following components: a water filter 32, a flow meter 34, a water-reservoir-and-heating unit 36, a water-temperature-control unit 38, a cup-holder-and-overflow/waste-drain unit 40, a beverage-dispensing unit 42, a beverage-transporting unit 44, a beverage-brewing unit 46, a cup-sensing unit 48, a liquid-waste disposal unit 50, a solid-waste-disposal unit 52, a barrier 54, and a controller 58. And although the machine 30 may brew beverages (e.g., tea, cocoa) other than coffee, for purposes of explanation the structure and operation of the machine are described in conjunction with the machine brewing coffee.

The water filter 32 filters the water that is used to brew the coffee. But one may omit the filter 32 from the beverage-brewing machine 30, particularly where the machine is installed in an establishment that has a water-purification system (not shown in FIG. 3) separate from the machine.

The flow meter 34 measures the volume of water that the water-reservoir-and-heating unit 36 provides to the beverage-brewing unit 36, and thus allows the controller 58 to control the volume of brewed coffee. For example, if one desires to brew a 16-ounce cup of coffee, then the controller 58 opens a fill valve (not shown in FIG. 3) in the unit 36, electronically monitors the flow meter 34, and closes the fill valve when the flow meter indicates that 16 ounces of water (or another volume of water predetermined to provide 16 ounces of coffee) has passed into the unit 36 (and thus out of the unit 36 as described below). Because the flow meter 34 is located on the inlet (i.e., cold-water) side of the unit 36, the meter may be less expensive, more reliable, and have a longer operating life than if located on the outlet (i.e., hot-water) side of the unit 36.

The water-reservoir-and-heating unit 36 receives cold tap water via the water filter 32 and the flow meter 34, stores this water, and, under the control of the controller 58, heats the stored water to a desired temperature, for example a temperature in the range from 150° F. to just below the boiling point of water. The unit 36 includes a saturated boiler, one or more heating elements, a flow deflector, and one or more temperature sensors (these components not shown in FIG. 3). Each of the heating elements may be electric or any other type of conventional heating element, and the flow deflector causes the boiler to fill from one side (e.g., the bottom) with cold water and to empty from another side (e.g., the top) with hot water that is substantially unmixed with the incoming cold water. Each temperature sensor indicates to the controller 58 a temperature of the water at a respective location within the boiler; where multiple sensors and heating elements are present, the controller can determine and control a temperature profile within the boiler (either open-or closed-loop control) to more precisely control the temperature of the water provided to the brewing unit 50. In one implementation, the capacity of the boiler and the thermal output of the heating element(s) are such that the machine 30 can brew a 16-ounce cup of coffee in approximately 40-60 seconds, and can continue this output indefinitely. Alternatively, the reservoir-and-heating unit 36 may include a manually settable thermostat (not shown in FIG. 3) that maintains the temperature of the water at the temperature to which the thermostat is set.

The water-reservoir-and-heating unit 36 may include other conventional components (not shown in FIG. 3), such as a pressure-relief valve, a thermal cutoff, a strainer, a pressure regulator, an anti-siphoning check valve, and insulation. The pressure-relief value prevents and the boiler pressure from exceeding a predetermined safe pressure, and may empty into the liquid-waste disposal unit 50 via the overflow/waste drain unit 40. The thermal cutoff disables the heating element(s) if the temperature within the boiler exceeds a predetermined safe temperature. The strainer traps large particles that may escape the filter 32 and lodge in downstream components, and the pressure regulator, which may be located between the filter and flow meter 34, regulates the pressure at which water enters the flow meter to, e.g., 40 PSI for consistent performance in varied environments. A flow regulator could also be used in place of a pressure regulator. The anti-siphoning check valve prevents water in the boiler from flowing "backwards" through the meter 34 and filter 32 into the tap-water supply, and the insulation slows heat loss from the boiler.

The water-temperature-control unit 38 can alter the temperature of the water from the reservoir unit 36 to allow a different brew temperature from cup to cup. The temperature-control unit 38 receives water from the reservoir 36 during a beverage-brewing cycle, and, in response to the controller 64, adjusts the temperature of the water received from the reservoir. In one implementation, the reservoir and heating unit 36 heats the water in the reservoir to a predetermined maximum temperature and the temperature-control unit 38 includes a valve assembly (not shown in FIG. 3) for mixing the heated water from the reservoir 36 with colder unheated water from the flow meter 34. The colder water lowers the temperature of the water used to brew coffee from the temperature of the water in the reservoir. The temperature-control unit 38 may operate in an open-loop configuration by relying on a thermodynamic algorithm that, using the sensed temperatures of the heated and cold water, regulates the amount of cold water mixed with the heated water to provide brew water having a desired temperature. Alternatively, the temperature-control unit 38 may operate in a closed-loop configuration by sensing the temperature of the water provided to the brewing unit 46 and, in response to the sensed temperature, regulating the amount of cold water mixed with the heated water to provide brew water having the desired temperature. If the temperature of the cold water is known and relatively stable, then one can enter this temperature into the memory 62 via the control panel 64, and the temperature-control unit 38 may operate in an open-loop configuration. Moreover, instead of actually mixing cold tap water from the meter 34 with the heated water, the temperature-control unit 38 may include a heat exchanger that allows the cold water to cool the heated water without actually mixing with the heated water. Using this technique, the cooling water may bypass the filter 32 and meter 34, thus potentially extending their operating lifetimes. The temperature control unit 38 may also have the ability to heat the brew water above the temperature of the water in the reservoir 36.

Alternatively, one may omit the temperature-control unit 38 from the machine 30, and depend on the reservoir-and-heating unit 36 to heat the water to the desired temperature. For example, the unit 36 may maintain the water in the reservoir at a predetermined minimum temperature, and then heat the water to a respective desired temperature at the beginning of each brew cycle. If, however, the unit 36 heats the water beyond the desired brew temperature, then the machine 30 may partially or fully purge the boiler one or more times to reduce the water temperature to a desired level.

An advantage of the temperature-control unit 38 is that it provides water at the desired brew temperature relatively quickly to immediately if the water in the reservoir 36 is at or higher than the desired brew temperature; a disadvantage is that the unit 38 may add complexity and expense to the machine 30.

Comparatively, although omitting the temperature-control unit 38 may slow the machine's brewing speed, the reservoir-and-heating unit 36 can heat the water used to brew each cup of coffee from a predetermined minimum temperature to any desired brewing temperature under software control (via the controller 64) without adding any expense or complexity to the machine. One can design the boiler (not shown in FIG. 3) such that the cold tap water entering the reservoir 36 to replace the expelled brew water drops the temperature of the water in the reservoir to or below the predetermined minimum temperature, thus readying the reservoir for the next cup.

The cup-holder-and-overflow/waste-drain unit 40 holds a cup (not shown in FIG. 3) while the beverage-dispensing unit 42 fills the cup with the brewed beverage. The unit 40 also includes a drain portion to absorb, e.g., spillage from the cup, drippings from the dispensing unit 42 after the cup has been removed, rinsant from a rinse cycle, and cleaner solution from a cleaning cycle (the rinsing and cleaning cycles are described below in conjunction with FIGS. 7-12. The drain portion of the unit 40 may be removable for emptying, or may be connected to the liquid-waste disposal unit 50 or directly to a waste-water line (not shown in FIG. 3) of the establishment in which the machine 30 is installed. And as discussed above, a pressure-relief valve of the water-reservoir-and-heating unit 36 may vent to the drain portion of the unit 40, particularly where the drain portion is connected to the liquid-waste disposal unit 50 or directly to a waste-water line.

The beverage-dispensing unit 42 includes a spout (not shown in FIG. 3), and dispenses the brewed beverage into the cup (not shown in FIG. 3) as discussed in the preceding paragraph. Alternatively, the unit 42 may include multiple interchangeable spouts for cups and beverages of different sizes.

The beverage-transporting unit 44 transports the brewed beverage from the brewing unit 46 to the dispensing unit 42, and may also transport liquid waste to the liquid-waste disposal unit 50. The unit 48 may include an electronically controllable valve (not shown in FIG. 3), which, in response to the controller 58, opens after the brewing unit 46 has brewed the beverage to allow the beverage to flow to the dispensing unit 42. To prevent the dispensing unit 42 from dispensing a beverage when no cup is present, the controller 58 may close the valve if the cup sensor 48 indicates that no cup is present in the cup-holder portion of the unit 40. The controller 58 may also close the valve at other times and otherwise operate the valve as described below in conjunction with FIGS. 7-15. Alternatively, the beverage-transporting unit 44 may include multiple valves as described below in conjunction with FIGS. 16-19.

The beverage-brewing unit 46 receives heated water from the water-reservoir-and-heating unit 36 (via the water-temperature-control unit 38 if present), receives ground coffee from an operator (not shown in FIG. 3), brews coffee according to a modified French press technique, and then provides the brewed coffee to the beverage-dispensing unit 42 via the beverage-transporting unit 44. Of course the brewing unit 46 may brew beverages other than coffee (e.g., tea). The brewing unit 46 is further described below in conjunction with FIGS. 4-12 and 20-22.

As discussed above, the cup-sensing unit 48 indicates to the controller 58 whether a cup (not shown in FIG. 3) is present in the cup-holder portion of the cup-holder-and-overflow/waste-drain unit 40. If the cup is not present after the brewing unit 46 has brewed coffee, then the controller 58 may deactivate the beverage-transporting unit 44 to prevent the beverage-dispensing unit 42 from dispensing brewed coffee directly into the drain portion of the unit 40. Alternatively, if the cup is present during a rinse or cleaning cycle (described below), then the controller 58 may deactivate the beverage-transporting unit 44 to prevent rinsant or cleaning solution from entering the cup. The cup-sensing unit 48 may include any type of sensor, such as an optical (reflective or interrupt), mechanical, or ultrasonic sensor.

The liquid-waste disposal unit 50 receives liquid waste from the cup-holder-and-overflow/waste-drain unit 40 and/or from the beverage-transporting unit 44 as discussed above, and disposes of this waste. The disposal unit 50 may include a conduit (not shown in FIG. 3) that is connected to the waste-water line (not shown in FIG. 3) of the establishment in which the machine 30 is installed, or to a liquid-waste container (not shown in FIG. 3). Alternatively, the disposal unit 50 may receive liquid waste from one or more other components of the machine 30.

The solid-waste disposal unit 52 receives spent coffee grounds and disposable filters (if used) from the brewing unit 46 as discussed below. The disposal unit 52 may include a receptacle that one periodically removes from the machine 30 for emptying, or may include a chute that empties into an electronic garbage disposer, directly into the waste-water line of the establishment in which the machine 30 is installed, or into a receptacle that requires periodic emptying. In addition, the solid-waste-disposal unit 52 may be connected to receive tap water, and may use the tap water to flush spent coffee from the disposal unit into the garbage disposer or directly into the waste-water line. The disposal unit 52 may periodically commence an automatic flushing sequence, e.g., after brewing each cup of coffee. Or, one may commence or perform the flushing sequence manually.

The moisture barrier 54 may separate the controller 58 and associated circuitry (not shown in FIG. 3) from other components of the machine 30. For example, steam from hot water and brewing or brewed coffee may condense and damage or otherwise render inoperable the controller 58. Furthermore, condensation on the conduits that carry cold tap water may cause similar problems. Therefore, the moisture barrier 54 helps keep the controller 58 and associated circuitry dry. Alternatively, the brew chamber (not shown in FIG. 3) of the brewing unit 46 may act as a moisture barrier such that the separate moisture barrier 54 may be omitted.

The controller 58 controls the operation of some or all of the other components of the brewing machine 30 as discussed above, and includes a processor 60, a memory 62, a control panel and display 64, and a communications port 66.

The processor 60 executes a software program stored in the memory 62 or in another memory (not shown), and controls the operations of the components of the machine 30 as described above and as described below.

In addition to storing one or more software programs, the memory 62 (which may be nonvolatile or include a nonvolatile portion) may store sets of predetermined brew parameters as discussed below in conjunction with FIGS. 7-12, and may provide working memory for the processor 60. The memory 62 may also log the total number of cups, the number of cups of each cup size, the total volume of water passing through the machine 30, or the total volume of beverage brewed since the first use of the machine, since the last service call, or since the replacement of a part, as a way to schedule maintenance. The memory 62 may also log the number of rinsing and cleaning cycles to document how well the machine has been maintained for warranty purposes. In addition, the memory 62 may log machine errors to facilitate a technician's diagnosing a problem during a service call. The memory 62 may save time stamps (the controller 58 may include a real-time clock to generate the time stamps) for one or more of the above-described events. Furthermore, the memory 62 may store flags to indicate the state of the machine 30 from use to use. For example, if the reservoir unit 36 is drained one day but not refilled, then the memory 62 may store a corresponding flag that causes the display 64 to generate a warning to refill the reservoir the next time the brewing machine 30 is activated. Moreover, the memory 62 may log tasks and task details in addition to those discussed above. For example, the memory 62 may log with time stamps every action the brewing machine 30 takes. For example, the memory 32 may log for each brew cycle a time stamp indicating when the cycle begins and ends, the beverage size, desired water temperature, the actual water temperature, whether the brew cycle was cancelled (and a time stamp indicating when), and whether and how long the machine 30 had to wait for the water to reach the brewing temperature. In addition, the memory 62 may log for every rinsing and cleaning cycle a time stamp indicating when the cycle begins and ends, and the desired and actual water temperatures. The memory 62 may also log a time stamp indicating each power up of the machine 30. Such detailed logs may provide to a coffee-shop owner or coffee roaster desired usage/demographic information such as the times of the day when the most coffee is brewed/sold and the types of coffee being purchased.

The control panel and display 64 allows an operator (not shown in FIG. 3) to enter brewing options (e.g., coffee type, cup size, and brewing parameters, and work flow) or to select brewing options from a menu that the processor 60 may generate on the display. For example, the operator may select via the control panel and display 64 individual brewing parameters (e.g., water temperature, cup size, and brewing time), or a set of predetermined brewing parameters stored in the memory 62. As an example of the latter, a coffee roaster may have determined preferred brewing parameters for its coffee. One may then store these preferred parameters in the memory 62 as a set, and associate the set with an identifier, such as the name or type of the coffee. Therefore, instead of entering or selecting each brewing parameter individually, which may be tedious, the operator merely enters or selects from a menu the identifier, and the controller 58 causes the machine 30 to brew coffee according to the set of parameters corresponding to the identifier.

The communications port 66 allows the processor 60, memory 62, and control panel and display 64 to communicate with one or more devices external to the machine 30. For example, the port 66 may be connected to a computer (not shown in FIG. 3) so that one can program or run diagnostics from the computer. Or, the port 66 may be connected to the internet, so that one can download into the machine's memory 62 data such as sets of brewing parameters from coffee roasters or suppliers, or upload from the memory via the internet machine usage/demographic information such as described above and below, service/error logs, or machine settings. Where the processor 60 executes a web interface (not shown in FIG. 3), then one may access the brewing machine 30 via a web browser over a secure channel that requires, e.g., one to enter a username and password before gaining remote access to the machine. In addition, the port 66 may receive data via a wireless channel, such as a set of brewing parameters from a RFID tag or a barcode on a container of coffee or on a coffee cup (the tag may hold the cup owner's preferred coffee type, cup size, or brew parameters). Furthermore, the port 66 may allow the processor 60 to upload demographic information, such as coffee-drinker preferences and number of cups brewed, to a coffee roaster or supplier or to the manufacturer/supplier of the machine 30. Moreover, the port 66 may be connected to and receive information (e.g., the number of beverages ordered, price, size) from other machines (e.g., a cash register) in the coffee shop, and act as a portal for downloading/uploading data to/from these other machines.

Still referring to FIG. 3, alternative embodiments of the beverage-brewing machine 30 are contemplated. For example, the machine 30 may include one or more components (not shown), one or more of the above-described units or components may be omitted, the function of multiple units may be consolidated into fewer units, or the function of a single unit may be divided among multiple units. Moreover, the brewing machine 30 (FIG. 3) may have a modular design that allows one to remove the brewing unit 46 and one or more of the other units of the machine as respective units; therefore, the modular design may facilitate repair or replacement of the removable units. Furthermore, the machine 30 may be automated such that an operator need not provide ground coffee to the brewing unit 46. Such an automated version of the machine 30 may include a coffee-bean hopper, a coffee grinder, a ground-coffee transporting unit, and one or more other components such as described in International Application No. PCT/US2006/013930 filed on Apr. 11, 2006, which was previously incorporated by reference.

Figure 4:
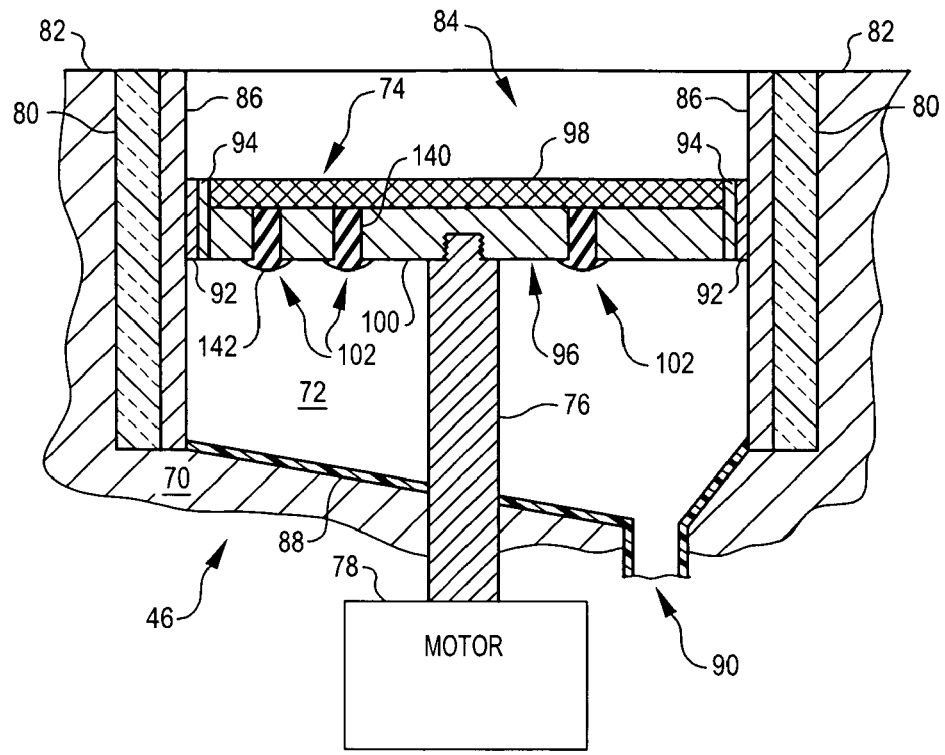
FIG. 4 is a cut-away side view of the brewing unit of FIG. 3 according to an embodiment of the invention.

FIG. 4 is a cut-away side view of the beverage-brewing unit 46 of FIG. 3 according to an embodiment of the invention. As discussed above in conjunction with FIG. 3, the brewing unit 46 allows the machine 30 to brew coffee according to a modified French press technique, and to brew other beverages (e.g., tea) as well.

The beverage-brewing unit 46 includes a chamber block 70, a brewing chamber 72 disposed within the chamber block, a piston assembly 74 disposed within the brewing chamber, a drive shaft 76, a motor 78 for driving the piston assembly up and down within the brewing chamber, and a thermal insulator 80 disposed around the brewing chamber.

The chamber block 70 has a flat top surface 82.

The brewing chamber 72, which may be cylindrical, includes an opening 84, a stainless-steel side wall 86, a plastic end cap 88, and an exit port 90, and holds the ground coffee and water (neither shown in FIG. 4) while the coffee brews. The end cap 88 is sloped toward the exit port 90 so as to direct liquid (e.g. brewed coffee, rinsant, cleaning solution) to the port for dispensing via the beverage-transporting and —dispensing units 44 and 42 (FIG. 3) or for disposing via the liquid-waste-disposal unit 50 (FIG. 3). Although the tops of the thermal insulator 80 and the side wall 86 are shown as being coplanar with the surface 82, the surface 82 may extend over and cover one or both of the insulator and side wall.

The piston assembly 74 is the same shape as the brewing chamber 72, and includes a seal 92 (made from, e.g., PTFE [marketed as Teflon®]), a seal-urging member 94 (e.g., a rubber gasket), and a filter assembly 96. The seal-urging member 94 forces the seal 92 against the side wall 86 of the brewing chamber 72 such that the piston assembly 74 forms a water-tight seal with the side wall. The filter assembly 96, which is further described below in conjunction with FIGS. 5-6, includes a filter 98 and a base 100 having one or more check valves 102. As further described below in conjunction with FIGS. 7-12, as the piston assembly 74 moves upward, the filter assembly 98 filters spent coffee grounds from the brewed coffee; and as the piston assembly moves downward, the filter assembly forces the brewed coffee out of the brewing chamber 72 via the exit port 90. Furthermore, the base 100 of the filter assembly 96 may threaded onto or otherwise removably attached to the drive shaft 76 to facilitate repair or replacement of the piston assembly 74.

The drive shaft 76 may be a conventional screw shaft that moves the piston assembly 74 upward when the motor 78 rotates in one direction and downward when the motor rotates in the opposite direction. The chamber block 70 may include anti-rotation stops or other components (not shown in FIG. 4) that prevent the piston assembly 74 from rotating with the shaft 76 and motor 78.

The motor 78, which is responsive to the controller 58 (FIG. 3), may be any type of motor, such as a stepper motor, suitable to drive the piston assembly 74. The chamber block 70 or the motor 78 may include a sensor assembly (not shown in FIG. 4), such as one or more limit switches, that indicates to the controller 58 the position, speed, and traveling direction of the piston assembly 74.

The insulator 80 may allow a more precise control of the brewing temperature by limiting heat loss through the side wall 86 of the brew chamber 72. The insulator 80 may also include a heating element and a temperature sensor (neither shown in FIG. 4) that allow the controller 58 to maintain the side wall 86 at a predetermined temperature. Alternately, the insulator 80 may include a water jacket (not shown) that the water-reservoir-and-heating unit 36 (or the water-temperature-control unit 38 if present) of FIG. 3 or another source (not shown in FIG. 4) fills with hot water. Using the temperature sensor, the controller 58 may implement closed-loop control of the side-wall temperature by regulating the flow of water through the jacket. And to cool the side wall 86, the controller 58 may route tap water through the jacket.

Still referring to FIG. 4, alternative embodiments of the beverage-brewing unit 46 (FIG. 3) are contemplated. For example, the machine may include components not shown, or may exclude one or more of the components that are shown. Furthermore, the components may be made from any suitable materials. Moreover, although shown oriented vertically, the brewing chamber 72 may be oriented in another direction, such as horizontal, with appropriate modification (such as a seal (not shown) over the chamber opening 84) to the brewing machine 30.

Figure 5:
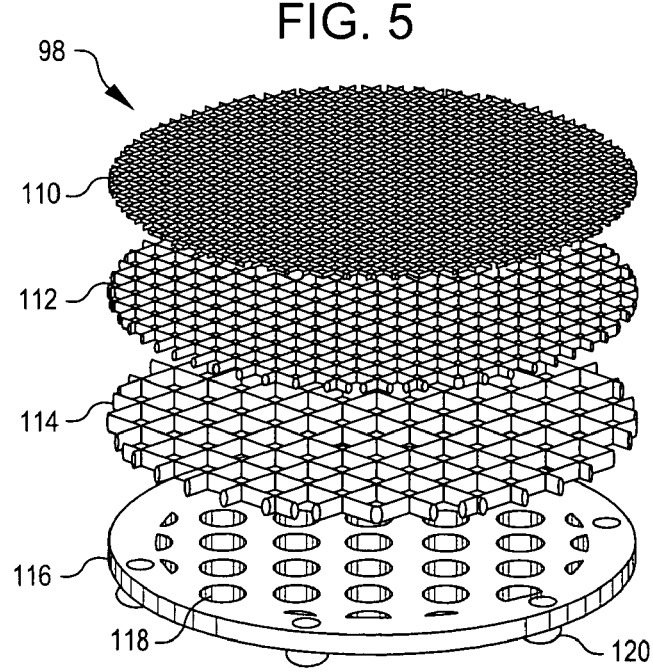
FIG. 5 is an exploded isometric view of the filter of FIG. 4 according to an embodiment of the invention.

FIG. 5 is an exploded isometric view of the filter 98 of FIG. 4 according to an embodiment of the invention where the brewing chamber 72 (FIG. 4) is cylindrical.

The filter 98 includes one or more (here three) wire-mesh layers 110, 112, and 114 mounted to a plate 116.

The mesh layers 110, 112, and 114 may be sintered or otherwise attached together and to the plate 116, and may be formed from stainless steel or any other suitable material. The top mesh layer 110 may have openings with diameters in the range of 30-150 microns (μm) (e.g., 70 μm) or within another range depending on the filter resolution desired for the filter 98. The middle layer 112 may have larger openings than the top layer 110, and the bottom layer 114 may have openings larger than those of the middle layer. Having openings with diameters that increase from the top layer 110 to the bottom layer 114 helps prevent filtrate (e.g. spent coffee grounds) from clogging the filter 98, and also allows the lower layers to provide structure to the filter without restricting fluid flow. Alternately, one or more of the layers 110, 112, and 114 may have etched openings. An advantage of the top layer 110 having etched openings is that the etched openings may provide the top layer with a flatter surface, which may facilitate removal of filtered matter (e.g., coffee grounds) from the top layer by, e.g., wiping with a squeegee.

The mounting plate 116 may be formed from stainless steel or any other suitable material, may have multiple large openings 118 and captive fastening features 120, and, along with the lower layers 112 and 114, may provide strength and rigidity to the filter 98.

Although not shown, a paper filter may be disposed on the top layer 110 and removed after each use. The paper filter may provide a finer filtration than the filter 98.

Figure 6:
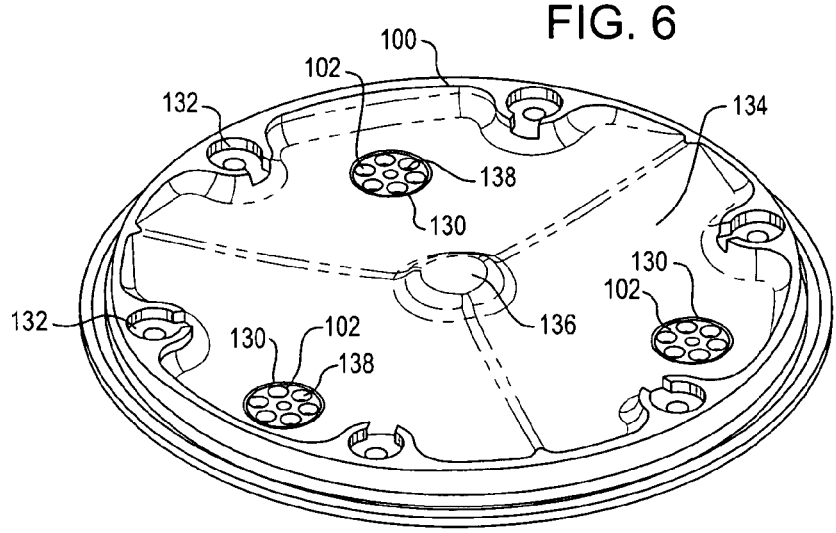
FIG. 6 is an isometric view of the filter base of FIG. 4 according to an embodiment of the invention.

FIG. 6 is an isometric view of the filter base 100 of FIG. 4 according to an embodiment of the invention where the brewing chamber 72 (FIG. 4) and the filter 98 (FIGS. 4-5) are cylindrical.

The base 100 is a plate that may be made from stainless steel or from any other suitable material, and, in addition to the one or more (here three) check valves 102, includes one or more check-valve ports 130, one or more filter-mounting recesses 132, a bottom 134, and a threaded shaft receptacle 136 (dashed line).

Referring to FIGS. 4 and 6, each check valve 102 is made from a flexible material such as silicone rubber, is mounted within a respective port 130, and includes one or more openings 138, an elastic shaft 140, and a head 142. As the piston assembly 74 moves downward when the lower portion of the brewing chamber 72 beneath the piston assembly is filled with a liquid (e.g., brewed coffee), the pressure generated by the piston movement forces the head 142 against the base 100 such that the head forms a liquid-tight seal with the base; consequently, no gas or liquid flows past the head and through the respective port 130. If the beverage-transporting unit 44 (FIG. 3) opens the exit port 90, then the piston assembly 74 transmits the pressure to the liquid, forcing it out of through the exit port. Conversely, as the piston assembly 74 moves upward when the upper portion of the brewing chamber 72 above the piston assembly contains a liquid and the beverage-transporting unit 44 closes the exit port 90, the pressure in the lower portion of the brewing chamber lessens. This lessening pressure generates a suction that pulls the head 142 away from the base 100 —the stretching of the elastic shaft 140 allows this pulling away of the head; consequently, the suction also pulls the liquid in the upper portion of the brewing chamber through the openings 138 and the port 130 and into the lower portion of the brewing chamber 72. But the filter 98 prevents solids such as ground coffee from passing into the lower portion of the brewing chamber 72, thus filtering the liquid.

Referring again to FIG. 6, the filter-mounting receptacles 132 are sized to receive the captive fastening features 120 on the filter-mounting plate 116 (FIG. 5), and screws (not shown in FIG. 6) inserted through the receptacles from the bottom of the base 100 engage the threaded standoffs to secure the base to the filter 98 (FIG. 5). O-rings (not shown in FIG. 6) or other sealing members may be placed in the receptacles 132 to prevent liquid from leaking through the screw threads.

The bottom 134 of the base 100 may be contoured to direct liquid toward the check-valve ports 130 while the piston assembly 74 (FIG. 4) moves upward.

The threaded shaft receptacle 136 allows removable attachment of the piston assembly 74 (FIG. 4) to the shaft 76 (FIG. 4).

FIGS. 7-12 illustrate operation of the beverage-brewing machine 30 of FIG. 3 during a beverage-brewing cycle according to an embodiment of the invention, with reference to the beverage-transporting unit 44 of FIG. 3 and the beverage-brewing unit 46 of FIGS. 3-4. In this embodiment, the beverage-transporting unit 44 includes a valve 150, which connects the exit port 90 to the beverage-dispensing unit 42 (FIG. 3) in a first position (shown, e.g., in FIG. 7), and which connects the exit port to the liquid-waste disposal unit 50 (FIG. 3) in a second position (shown, e.g., in FIG. 8). Furthermore, although it may not be explicitly stated, the controller 58 (FIG. 3) may control one or more of the below-described steps. Moreover, although the operation of the machine 30 is described for brewing coffee, the operation for brewing another beverage, such as tea, may be the same as or similar to the described operation.

Referring to FIGS. 3-4 and 7-12, the operation of the beverage brewing machine 30 during a beverage-brewing cycle is discussed according to an embodiment of the invention.

Figure 7:
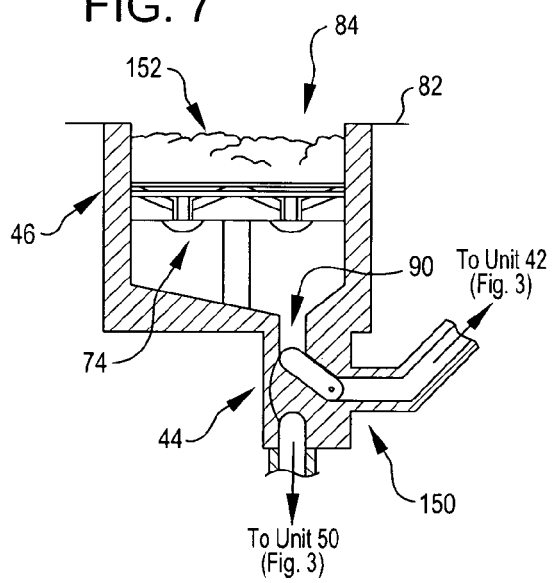
FIGS. 7-12 illustrate a brewing cycle of the beverage-brewing machine of FIG. 3 according to an embodiment of the invention.

Referring to FIG. 7, after a human operator (not shown in FIGS. 3-4 and 7-12) activates the machine 30 by, e.g., turning "on" a power switch (not shown in FIGS. 3-4 and 7-12), the machine 30 performs a self-check/initialization during which the piston assembly 74 moves into a respective "home" position if it is not already in this position. For example, the piston assembly 74 may move into a position that is a predetermined distance below the chamber-block surface 82, where the distance creates a space sufficiently large to receive ground coffee 152 from the operator. Alternatively, the piston assembly 74 may already be in its respective home position from the last brew cycle, or may move into any other non-home position that is suitable for starting the brew cycle. While the piston assembly 74 is moving into its home position or another starting position, the valve 150 is in its first position (e.g., connects the exit port 90 to the beverage-dispensing unit 42) so that no pressure or suction is created in the lower portion of the chamber 72 beneath the piston assembly. Furthermore, to make sure that the chamber 72 is empty of liquid (e.g., brewed coffee, water), as part of the self-check/initialization, the machine 30 may first perform a purge routine that expels "left-over" liquid from the chamber via the exit port 90 (or via a separate waste port per FIGS. 16-18). Although the machine 30 may not "know" the volume of this "left-over" liquid, it may "assume" that a maximum volume of liquid (e.g., 16 ounces) is in the chamber 72. This "left-over" liquid may result from the interruption of a previous brewing, rinsing, or cleaning cycle due to, e.g., a power failure, system error, or operator error. The purging routine may be the same or similar to the beverage-dispensing routine described below in conjunction with FIG. 11. After performing the purge routine, the machine 30 continues with the self-check/initialization routine per above. In addition to the above-described functions, the machine 30 may perform other functions (e.g., turning on the boiler) during the self-check/initialization routine.

Next, the operator enters a beverage size (e.g., 8 ounces, 16 ounces), and one or more brewing parameters (e.g., water temperature, brew time) via the control panel 70. The machine 30 may allow the operator to enter a custom beverage size (e.g., 9 ounces, 11 ounces), or may constrain the operator to one or more predetermined sizes (e.g., from 6 to 16 ounces in 2-ounce increments). Moreover, the operator may enter each brewing parameter separately, or may enter an identifier, such as the name of the selected roast, to select a set of predetermined brew parameters that are stored in the memory 62 and associated with the identifier. If the operator enters the brew parameters separately, but fails to enter one or more required parameters, then the machine 30 may assign a default value to each of the parameters not entered. And if the operator enters a set of brewing parameters via an identifier, he may alter one or more of these pre-programmed parameters either directly or abstractly. An example of the latter is where the operator selects an "abstract" brewing strength (e.g., weak, normal, strong) that the controller 58 converts into an actual brew time or temperature in a pre-programmed manner. In addition, the machine 30 may, via the display 64, remind the operator to place a cup (not shown in FIG. 7) in the cup holder 40.

Then, the operator measures and grinds an amount of coffee at a particular grind size using a coffee grinder (not shown in FIG. 7) separate from the machine 30, and loads the ground coffee 152 into the chamber 72 via the opening 84. The controller 58 may, via the display 64, indicate to the operator the amount of coffee that the operator should grind and the grind size based on the beverage size and brew parameters previously entered by the operator. One may preprogram the memory 62 with a look-up table that associates the amount and grind size with the beverage size and brewing parameters, or the controller may calculate the amount and grind size from one or more of the beverage size and brewing parameters (e.g., brewing strength) that the operator entered or selected.

Figure 8:
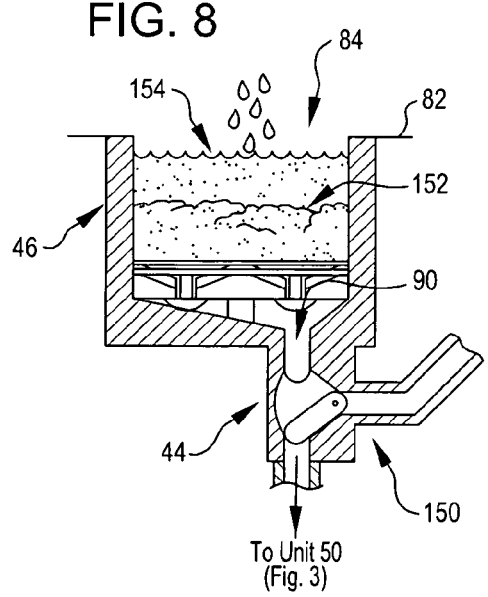

Referring to FIG. 8, after the operator loads the ground coffee 152 into the brewing chamber 72, the motor 78 moves the piston assembly 74 downward to or near the bottom of the chamber. When the piston assembly is in the desired position, the valve 150 moves into its second position (e.g., connects the exit port 90 to the liquid-waste disposal unit 50), which effectively closes the outlet from the brewing chamber 72.

While the operator is grinding and loading the coffee 152 into the brewing chamber 72 and the piston assembly 74 is moving downward, the water-reservoir-and-heating unit 36 is heating the water to a predetermined temperature if the water is not already at this temperature. In one example, the unit 36 heats the water above the desired brewing temperature so that the water-temperature-control unit 38 can provide to the chamber 72 water at the desired brewing temperature by mixing the heated water from the reservoir with cold tap water as described above in conjunction with FIG. 3. In another example, the reservoir-and-heating unit 36 heats the water to the brewing temperature, and the temperature-control unit 38 is inactive or omitted. If the water temperature is too high in this latter example (e.g., from a previous brewing cycle), then the machine 30 may purge a calculated or predetermined amount of water from the boiler within the reservoir unit 36 to cool the water to or below the desired temperature; in the latter case, the reservoir-and-heating unit 36 then heats the water to the desired temperature. These and other techniques allow control of the brewing temperature from cup to cup.

Next, the reservoir-and-heating unit 36 fills the brewing chamber 72 with a desired amount of water 154 having the desired brewing temperature via a nozzle (not shown in FIGS. 3-4 and 7-12). The controller 58 opens a valve (not shown in FIGS. 3-4 and 7-12) so that water flows from the filter 32, through the flow meter 34, and into the reservoir 36. The cold water flowing into the reservoir 36 forces the hot water at the top of the reservoir out and into the brewing chamber 72. When the flow meter 34 indicates that the desired volume of water 154 has entered the chamber 72, the controller 58 closes the valve. The operator may then agitate the water and coffee mixture in the chamber 72 by, e.g., stirring the mixture. Such agitation facilitates the thorough wetting of the ground coffee. The spray pattern of the nozzle may also agitate the mixture, or the controller 58 may pulse the water through the nozzle for additional agitation.

Figure 9:
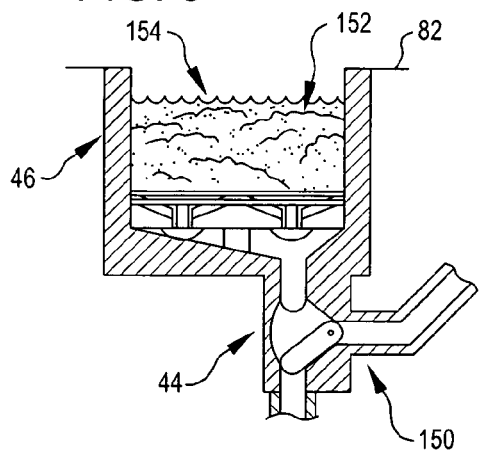

Referring to FIG. 9, after the desired amounts of ground coffee 152 and water 154 are in the chamber 72, the mixture remains in the chamber for the selected brewing time. During the brewing time, the controller 58 may activate a heating element (not shown in FIGS. 3-4 and 7-12) in the insulator 80 to maintain the brewing temperature as discussed above in conjunction with FIG. 4. Alternatively, the heating element in the insulator 80 may be continuously activated, or activated before the brew cycle.

Figure 10:
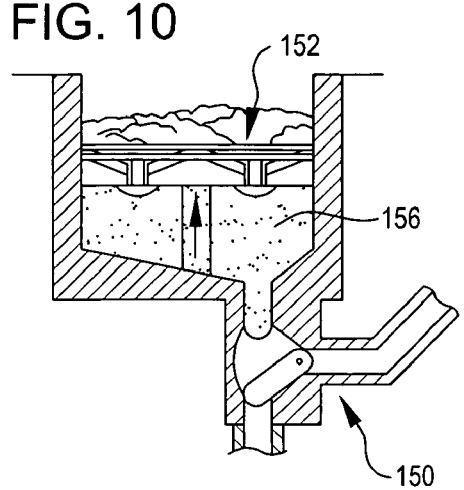

Referring to FIG. 10, after the brewing time has expired, the piston assembly 74 moves upward to filter the coffee grounds 152 from the brewed coffee 156. As discussed above in conjunction with FIG. 4, as the piston assembly 74 moves upward, suction pulls the brewed coffee 156 from above the piston assembly 74, through the filter 98 and the check-valve ports 130, to below the piston assembly. The filter 98 blocks the coffee grounds 152 from flowing through the check-valve ports 130. The piston assembly 74 continues moving upward until all of the brewed coffee 156 is below the piston assembly, and all of the coffee grounds 152 are resting on the filter 98. A pressure sensor (not shown in FIGS. 3-4 and 7-12) may be located within the brewing chamber 72, and the controller 58 may control the speed of the piston assembly 74 in a closed-loop manner to maintain the suction force beneath the piston assembly within a desired range that prevents damage to, e.g., the valve 150. Alternatively, the movement of the piston assembly 74 may be according to another suitable profile, such as in an open-loop manner. For example, the piston assembly 74 may move continuously at a constant velocity or may move in steps, with respective periods of non-movement between consecutive steps. This may allow the flow rate through the check-valve ports 130 to "catch up" with the suction below the piston assembly 74.

Figure 11:
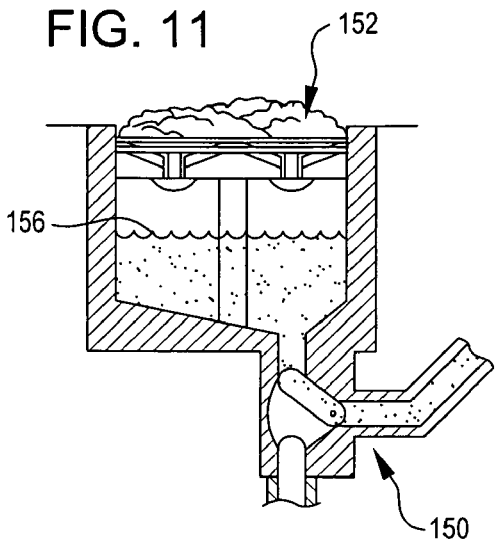

Referring to FIG. 11, the piston assembly 74 continues moving upward until the top surface of the filter 98 is coplanar with the surface 82 of the chamber block 70.

Next, the operator removes the coffee grounds 152 from the filter 98 by, e.g., wiping the grounds off of the filter, onto the surface 82, and into the solid-waste-disposal unit 52 with a squeegee or other instrument (not shown in FIG. 11). The operator may indicate via the control panel 64 that the grounds are removed, and in response to this indication, the brew cycle continues.

Alternatively, the piston assembly 74 does not move into a position where the filter 98 is coplanar with the surface 82, or does not stay in this position long enough for the operator to remove the coffee grounds 152. In this alternative, the operator subsequently removes the coffee grounds 152 as discussed below in conjunction with FIG. 12.

Then, the cup sensing unit 48 indicates whether a cup (not shown in FIGS. 3-4 and 7-12) is in the holder 40- in one example, the cup holder is a drip tray. If a cup is not in the holder 40, then the controller 58 may halt the brewing cycle, and may sound an audio or visual alarm, until the operator places a cup in the holder. If a cup is in the holder 40, then the brewing cycle continues as described below.

After the piston assembly 74 stops moving upward and a cup is in the holder 40, the valve 150 moves into its first position to connect the exit port 90 to the beverage-dispensing unit 42.

Next, the piston assembly 74 begins moving downward to dispense the brewed coffee 156 into the cup (not shown in FIGS. 3-4 and 7-12) via the exit port 90 and the valve 150. The downward movement of the piston assembly 74 may be continuous or stepped, and may have any suitable velocity/acceleration profile. As discussed above in conjunction with FIG. 4, as the piston assembly 74 moves downward, the check valves 102 close to prevent the brewed coffee 156 and any other fluids (e.g., air, water vapor) from flowing back through the filter 98. Consequently, the piston assembly 74 forces the brewed coffee 156 out of the port 90 and through the valve 150. The piston assembly 74 may move downward only a predetermined distance corresponding to the beverage size to prevent the forcing of air through the beverage-dispensing unit 42. Alternatively, the piston assembly 74 may moved downward enough to expel some air through the beverage-dispensing unit 42 to force the last bit of brewed coffee 156 out of the dispensing unit and into the cup. After the piston assembly 74 has finished moving downward, the valve 150 may switch to its second position.

Figure 12:
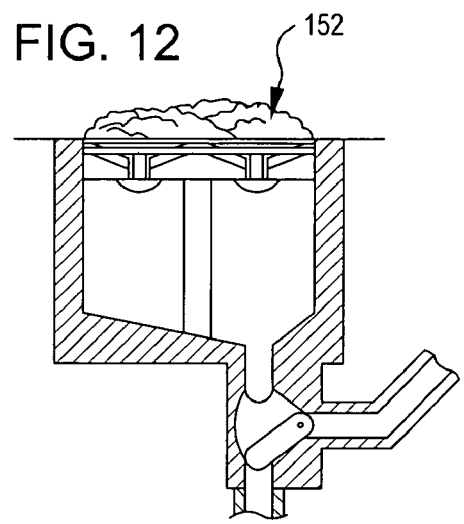

Referring to FIG. 12, after the brewed coffee 156 is dispensed, the piston assembly 74 moves upward and back into the home position. Of course if the piston assembly 74 is already in the home position, it remains in its current position. Furthermore, the controller 58 may indicate to the operator via the display 64 or other indicator (not shown in FIGS. 3-4 and 7-12) that he may remove the coffee-filled cup from the cup holder 40.

Next, the valve 150 moves to its second position (if it has not already done so) so that any residual brewed coffee in the beverage-transporting unit 44 or in the conduit between the valve and the beverage-transporting unit can drain via gravity to the liquid-waste-disposal unit 50.

Where the operator has not yet removed the coffee grounds 152 from the filter 98 as discussed in conjunction with FIG. 11, the piston assembly 74 first moves upward into a position where the top surface of the filter is coplanar with the surface 82.

After the operator removes the coffee grounds 152, the piston assembly 74 moves downward and back into the home position. As discussed above, the operator may indicate that the coffee grounds are removed via the display 64. Alternatively, the piston assembly 74 may remain in this coplanar position until the next cycle so that the operator can more easily determine whether the assembly has been wiped clean, and wipe the assembly clean if it hasn't already been wiped clean.

Still referring to FIGS. 3-4 and 7-12, other embodiments of the above-described brewing cycle are contemplated. For example, the order of the above-described steps may be altered, the steps described as being performed concurrently may be performed at different times, and steps described as being performed at different times may be performed concurrently. Furthermore, some of the steps may be omitted, and other steps not described above may be added.

Figure 13:
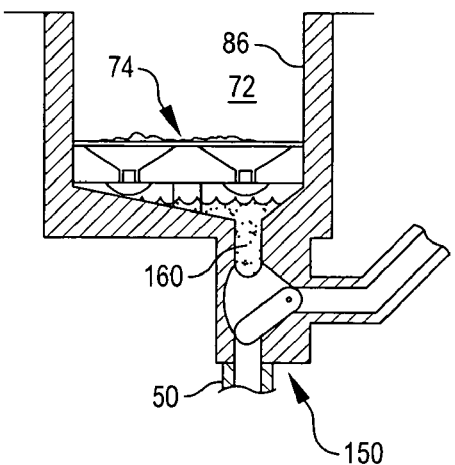
FIGS. 13-15 illustrate a residual-evacuation cycle of the brewing machine of FIG. 3 according to an embodiment of the invention.
Figure 14:
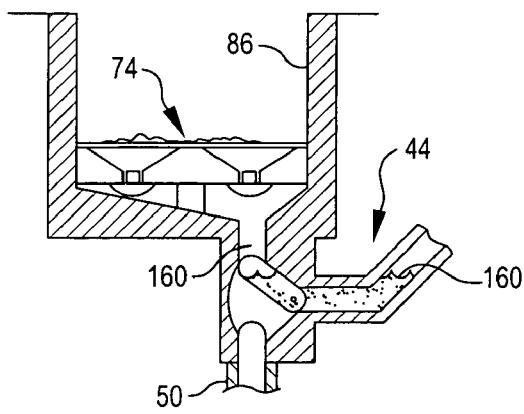
Figure 15:
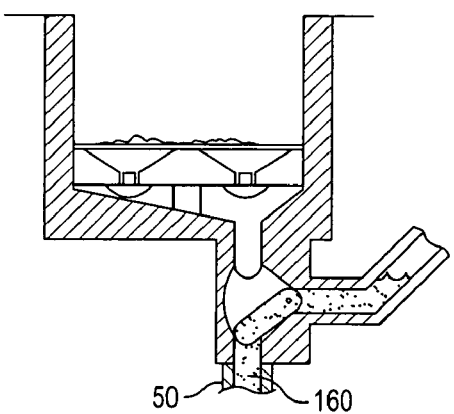

FIGS. 13-15 illustrate operation of the beverage-brewing machine 30 of FIG. 3 during a residual-liquid-removal cycle according to an embodiment of the invention. Although it may not be explicitly stated, the controller 58 (FIG. 3) may control one or more of the below-described steps.

Referring to FIG. 13 and as discussed above in conjunction with FIG. 12, after the completion of a beverage-brewing cycle, the piston assembly 74 returns to its home position in anticipation of the next brewing cycle.

But because of the surface tension of water (or other liquid used to brew the beverage), a small, i.e., residual, portion of the brewed beverage may cling to the chamber side wall 86 and to the piston assembly 74 even after the beverage is dispensed.

Over time, this residual 160 runs downward; because the valve 150 is in its second position to allow residual in the beverage-transporting unit 44 (a conduit in this embodiment) to drain, the residual 160 collects at the bottom of the brewing chamber 72.

Referring to FIG. 14, to drain the residual 160 from the brewing chamber 72, the valve 150 moves into its second position, and thus allows the residual to collect in the valve and in the beverage-transporting unit 44.

Next, referring to FIG. 15, to drain the residual 160 from the valve 150 and the beverage-transporting unit 44, the valve moves back into its second position, and thus allows the residual to drain to the liquid-waste-disposal unit 50 (also a conduit in this embodiment).

Referring to FIGS. 14-15, the brewing machine 30 (FIG. 3) may repeat the switching of the valve 150 between its first and second positions one or more times to drain additional residual 160 that may subsequently collect at the bottom of the brewing chamber 72. Furthermore, the machine 30 may begin this switching of the valve 150 immediately after the completion of a brew cycle, or at a predetermined time thereafter to allow time for the residual to collect at the bottom of the brewing chamber 72.

Referring again to FIGS. 7-12, a rinse cycle of the brewing machine 30 (FIG. 3) is described according to an embodiment of the invention. The rinse cycle may be similar to the brewing cycle described above in conjunction with FIGS. 3-4 and 7-12, except that no coffee or other flavor base is loaded into the chamber as shown in FIG. 7, and the water need not sit in the chamber 72 for the entire brew time. Furthermore, the machine 30 may not wait for the water in the reservoir unit 36 to heat to any particular temperature, and, because there is no flavor base to inhibit the movement of water through the filter 98, the piston assembly 74 may move a fraction of the distance that it moves during a beverage-brewing cycle. Moreover, the machine 30 may halt the rinse cycle if the cup sensing unit 48 (FIG. 3) senses a cup in the holder unit 40, and may sound an alarm (e.g., audio or visual) to notify the operator (not shown in FIGS. 7-12); this prevents the dispensing of rinse water into the cup. The machine 30 may perform the rinse cycle one or more times to flush residue of the brewed beverage from the chamber 72, the beverage-transporting unit 44, and the beverage-dispensing unit 42, and into the waste-drain unit 40.

After a rinse cycle, the brewing machine 30 may perform the residual-liquid-removal cycle described above in conjunction with FIGS. 13-15 to drain residual rinse water from the chamber 72.

Still referring to FIGS. 7-12, a cleaning cycle of the brewing machine 30 (FIG. 3) is described according to an embodiment of the invention. The cleaning cycle may be similar to the brewing cycle described above in conjunction with FIGS. 3-4 and 7-12, except that instead of coffee or another flavor base, the operator (not shown in FIGS. 3-4 and 7-12) loads a detergent or other cleaning substance (e.g., vinegar) into the chamber per FIG. 7. Furthermore, where the detergent or other cleaning substance is a liquid, then the machine 30 may perform the cleaning cycle without introducing water into the chamber 72. Moreover, the machine 30 may move the piston assembly 74 in steps, for example in five steps upward and in five steps downward, with a predetermined time such as one minute between each of the steps to increase the soak time and the cycling of the cleaning substance through the piston assembly 74. In addition, the machine 30 may halt the cleaning cycle if the cup sensing unit 48 (FIG. 3) senses a cup in the holder unit 40, and may sound an, e.g., audio or visual, alarm to notify the operator (not shown in FIGS. 7-12); this prevents the dispensing of cleaning solution into the cup. Furthermore, the display 64 (FIG. 3) may request the operator to wipe and scrub the top of the filter 98 (FIG. 4) when the filter top is coplanar with the surface 82, and the operator may indicate via the control panel 64 when he is done wiping/scrubbing. Moreover, the reservoir 36 may periodically introduce water into the chamber 72 during the soak portion of the cleaning cycle to agitate the cleaning solution. After the cleaning cycle, the machine 30 may perform the above-described rinse cycle one or more times to flush residue of the cleaning solution from the chamber 72, the beverage-transporting unit 44, and the beverage-dispensing unit 42, and into the waste-drain unit 40. Furthermore, the machine 30 may perform one or more rinse cycles before the cleaning cycle to dislodge and remove solids, e.g., coffee grounds.

FIGS. 16-19 illustrate operation of the beverage-brewing machine 30 of FIG. 3 during a beverage-brewing cycle according to another embodiment of the invention, with reference to the beverage-transporting unit 44 of FIG. 3 and the beverage-brewing unit 46 of FIGS. 3-4. In this embodiment, the beverage-transporting unit 44 includes two valves, the valve 150 and a valve 170, and the beverage-brewing unit includes two exit ports, the dispense exit port 90 and a waste exit port 172. The valve 170 connects the waste exit port 172 to the liquid-waste disposal unit 50 (a conduit in this embodiment) in a first position, and disconnects the waste exit port from the liquid-waste disposal unit in a second position. Furthermore, although it may not be explicitly stated, the controller 58 (FIG. 3) may control one or more of the below-described steps. Moreover, although the operation of the machine 30 is described for brewing coffee, the operation for brewing another beverage, such as tea, may be the same as or similar to the described operation.

Referring to FIGS. 3-4 and 16-19, the operation of the beverage brewing machine 30 during a beverage-brewing cycle is discussed according to another embodiment of the invention. Unless otherwise stated, the steps of the below-described brewing cycle are similar to the steps of the brewing cycle described above in conjunction with FIGS. 3-4 and 7-12. Therefore, some of the steps and functions common to both brewing cycles may be omitted for brevity.

Referring to FIG. 16, after an operator (not shown in FIGS. 3-4 and 16-19) activates the machine 30 by, e.g., turning "on" a power switch (not shown in FIGS. 3-4 and 16-19), the machine 30 performs a self-check/initialization during which the piston assembly 74 moves into a respective "home" position if it is not already in its respective home position. While the piston assembly 74 is moving into its home position or another starting position, the valve 150 is in its second position (i.e., connecting the liquid-waste-disposal unit 50 to the beverage-transporting unit 44) to allow residual liquid in the beverage-transporting and -dispensing units 44 and 42 to drain; this prevents residual liquid from being forced through the units 44 and 42 while the piston assembly 74 moves downward. Furthermore, the valve 170 is in its first position (i.e., connecting the port 172 to the disposal unit 50) such that no pressure or suction is created in the portion of the chamber 72 beneath the piston assembly 74.

Referring to FIG. 17, after the operator loads the ground coffee 152 into the brewing chamber 72, the motor 78 moves the piston assembly 74 downward to or near the bottom of the chamber.

After the piston assembly 74 is in the desired position, the valve 150 remains in its second position (i.e., connecting the liquid-waste-disposal unit 50 to the beverage-transporting unit 44), and the valve 170 switches to its second position (i.e., disconnecting the port 172 from the liquid-waste-disposal unit 50).

Next, the reservoir-and-heating unit 36 fills the brewing chamber 72 with a desired amount of water having the desired brewing temperature, and the mixture of water and ground coffee remains in the chamber for the selected brewing time.

After the brewing time has expired, the piston assembly 74 moves upward to filter the coffee grounds 152 from the brewed coffee 156.

Referring to FIG. 18, after the piston assembly 74 stops moving upward, the valve 150 moves into its second position to connect the exit port 90 to the beverage-transporting unit 44, and the valve 170 remains in its second position.

Then, the piston assembly 74 begins moving downward to dispense the brewed coffee 156 into the cup (not shown in FIGS. 3-4 and 16-19) via the exit port 90 and the valve 150.

Referring to FIGS. 3 and 19, after the brewed coffee 156 is dispensed, the valve 150 moves back into its first position to allow residual 160 to drain from the beverage-transporting and -dispensing units 44 and 42, and the valve 170 moves into its first position to allow residual 160 to drain from the chamber 72. The valves 150 and 170 may remain in their respective first positions until the next brewing, rinsing, or cleaning cycle.

Still referring to FIGS. 3-4 and 16-19, other embodiments of the above-described brewing cycle are contemplated. For example, the order of the above-described steps may be altered, the steps described as being performed concurrently may be performed at different times, and steps described as being performed at different times may be performed concurrently. Furthermore, some of the steps may be omitted, and other steps not described above in conjunction with FIGS. 16-19 (such as steps described above in conjunction with FIGS. 7-12) may be added.

Referring again to FIGS. 16-19, rinse and clean cycles of the brewing machine 30 (FIG. 3) may be similar to the brewing cycle described above in conjunction with FIGS. 3-4 and 16-19, and may also be similar to, and include steps from, the rinse and clean cycles described above in conjunction with FIGS. 7-12.

Figure 20:
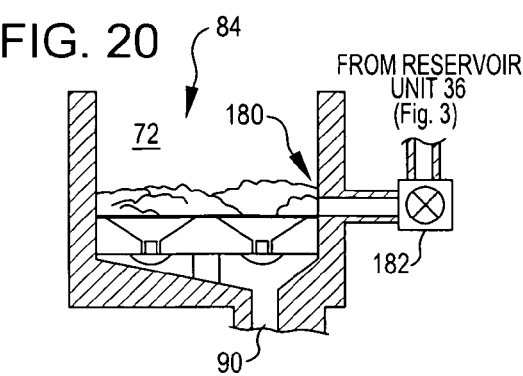
FIGS. 20-22 illustrate a portion of a brewing cycle of the brewing machine of FIG. 3 according to yet another embodiment of the invention.
Figure 21:
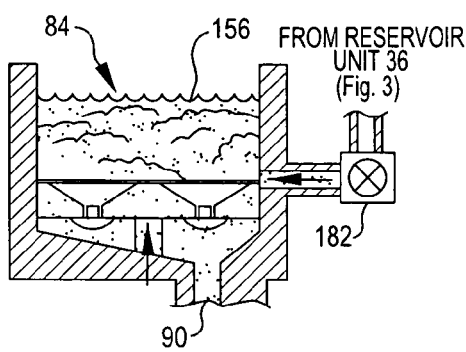
Figure 22:
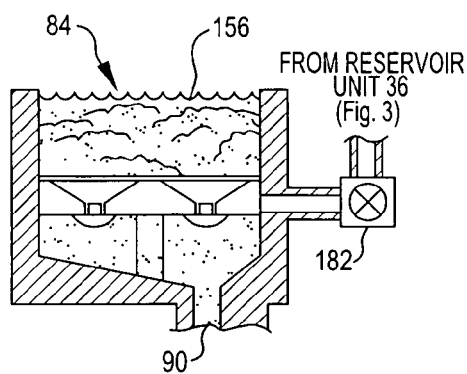

FIGS. 20-22 illustrate operation of the beverage-brewing machine 30 of FIG. 3 during a portion of a beverage-brewing cycle according to another embodiment of the invention, with reference to the beverage-brewing unit 46 of FIGS. 3-4. In this embodiment, the water from the reservoir-and-heating unit 36 enters the brewing chamber 72 from one or more inlets 180 (only one shown in FIGS. 20-22) instead of from a nozzle (not shown in FIGS. 3-4) disposed over the chamber opening 84, and the width(s) of the inlet(s) 180 is/are no thicker than the thickness of the piston assembly 74. Furthermore, although it may not be explicitly stated, the controller 58 (FIG. 3) may control one or more of the below-described steps. Moreover, although the operation of the machine 30 is described for brewing coffee, the operation for brewing another beverage, such as tea, may be the same as or similar to the described operation. In addition, although the operation of the machine 30 is described for an embodiment of the beverage-brewing unit 46 having only one inlet 180, the operation for an embodiment having multiple inlets 180 may be similar.

Referring to FIGS. 3-4 and 20-22, the operation of the beverage brewing machine 30 during a portion of the beverage-brewing cycle is discussed according to another embodiment of the invention.

Referring to FIG. 20, after the operator (not shown in FIGS. 3-4 and 20-22) loads the ground coffee into the chamber 72, the piston assembly 74 moves below the inlet 180.

Next, a valve 182 (which may be part of one of the units 36,38, and 46 of FIG. 3) opens to allow water from the reservoir unit 36 to enter the chamber 72 via the inlet 180, which may have a shape designed to agitate the mixture of water and ground coffee. For example, the inlet 180 may cause the mixture to swirl within the chamber 72.

Referring to FIG. 21, while water is entering the chamber 72 via the inlet 180, the piston assembly 74 begins moving upward.

Referring to FIG. 22, the piston assembly 74 stops when the top surface of the piston assembly is above the inlet 180, and then the valve 182 closes. Maintaining the valve 182 open until the top surface of the piston assembly 74 is above the inlet 180 allows the flow of water from the inlet to prevent ground coffee or other solids from clogging or otherwise migrating into the inlet.

The coffee 156 is then allowed to brew.

While dispensing the brewed coffee 156, the machine 30 may limit the downward movement of the piston assembly 74 so that the filtered coffee grounds (not shown in FIGS. 20-22) on top-of the piston assembly remain above, and thus to not clog or migrate into, the inlet 180.

Referring again to FIGS. 20-22, the inlet 180 may also facilitate agitation of a detergent and water during a cleaning cycle of the beverage-brewing machine 30 (FIG. 3). During a cleaning cycle, the top surface of the piston assembly 74 may remain below the inlet 180 for a predetermined time so that cleaning solution contacts and cleans the inlet.

Figure 23:
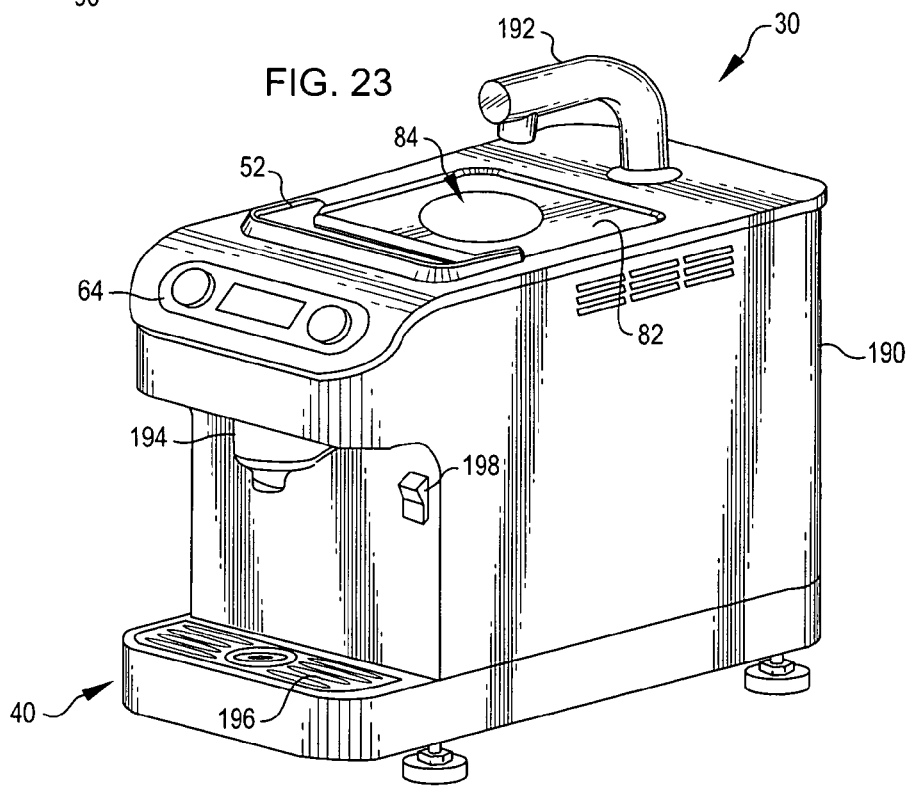
FIG. 23 is a perspective view of the beverage-brewing machine of FIG. 3 according to an embodiment of the invention.

FIG. 23 is a perspective view of the beverage-brewing machine 30 according to an embodiment of the invention.

Referring to FIGS. 3-4 and 23, in addition to the cup-holder-and-drain unit 40, the solid-waste-disposal unit 52, the control panel and display 64, the surface 82, and the brew-chamber opening 84, the machine 30 includes a stainless steel and plastic housing 190, a water-fill nozzle 192, a beverage dispensing spout 194, a tray 196, and a power switch 198.

The disposal unit 52 has an opening 199 that is contiguous with the surface 82 such that when the top of the piston assembly 74 is coplanar with the surface 82, an operator (not shown in FIGS. 3-4 and 23) may use a squeegee or other instrument (not shown in FIGS. 3-4 and 23) to wipe coffee grounds or other filtrate from the piston assembly, across the surface 82, and into the disposal unit.

The nozzle 192 is part of the beverage-brewing unit 46, and directs water from the water-reservoir-and-heating unit 36 into the brewing chamber 72 via the opening 84, the nozzle 192 provides clearance (e.g., 25 inches) sufficient to allow the wiping of coffee grounds from the filter 98 (FIG. 4) into the unit 52, and to allow the removal of the piston assembly 74 (FIG. 4). The nozzle 192 may be designed to promote wetting of the coffee grounds and agitation of the water-coffee mixture (neither shown in FIG. 23). For example, the nozzle 192 may include multiple angled orifices arranged in an angled radial pattern like a shower head, or may have a single, larger diameter jet. Parameters of the nozzle 192 that may be varied to provide the desired spray pattern include: the number of jets; flow rate; jet diameter; nozzle outlet angle; and, nozzle inlet pressure. Factors that one may take into account when designing the nozzle 192 include the desired fill time for filling the brewing chamber 72 (FIG. 4), and the water heat loss as the water travels from the nozzle to the brew chamber.

The dispensing spout 194 is part of the beverage-dispensing unit 42, and the tray 196, which is removable for cleaning, is part of the cup-holder-and-drain unit 40. The spout 194 may be one of a number of different-sized interchangeable spouts for different beverage or cup sizes.

Still referring to FIG. 23, alternate embodiments of the machine 30 are contemplated. For example, the placement and design of the components (e.g., disposal unit 52, controller and display 64, nozzle 192, dispenser 194, and tray 196) may change, and the machine 30 may be made from a suitable material other than stainless steel and plastic. Furthermore, although shown placed between the chamber opening 84 and the front of the machine 30 so that the operator can wipe the coffee grounds from the piston assembly 74 by pulling a squeegee toward the machine front, the disposal unit 52 may be disposed in another location adjacent to the chamber opening. In addition, the machine 30 may include an automatic wiping assembly to wipe the coffee grounds from the piston assembly 74 into the disposal unit 52. Moreover, instead of including only one spout 194, the machine 30 may include multiple spouts, and the brew chamber 72 (FIG. 4) may have a multi-cup capacity, so that the machine 30 can brew multiple cups of coffee simultaneously. Or, the machine 30 may include multiple brew chambers 72 so that the machine can simultaneously brew multiple beverage recipes. Furthermore, the communications port 66 (FIG. 3) may be connected to one or more cash registers to allow direct input of beverage recipes, and a batch/queue of orders; this can be done via the control panel 64 too. Moreover, where multiple cups of the same recipe are ordered, the machine 30 can simultaneously brew the total volume, and then dispense each cup separately via one or more of the spouts 194. For example, where the machine 30 dispenses each cup via a single spout 194, the machine may fill the first cup, prompt the operator to replace the first filled cup with a second empty cup and to indicate via the control panel 64 when the second cup is in place, fill the second cup, and repeat this procedure for subsequent cups.

Figure 24:
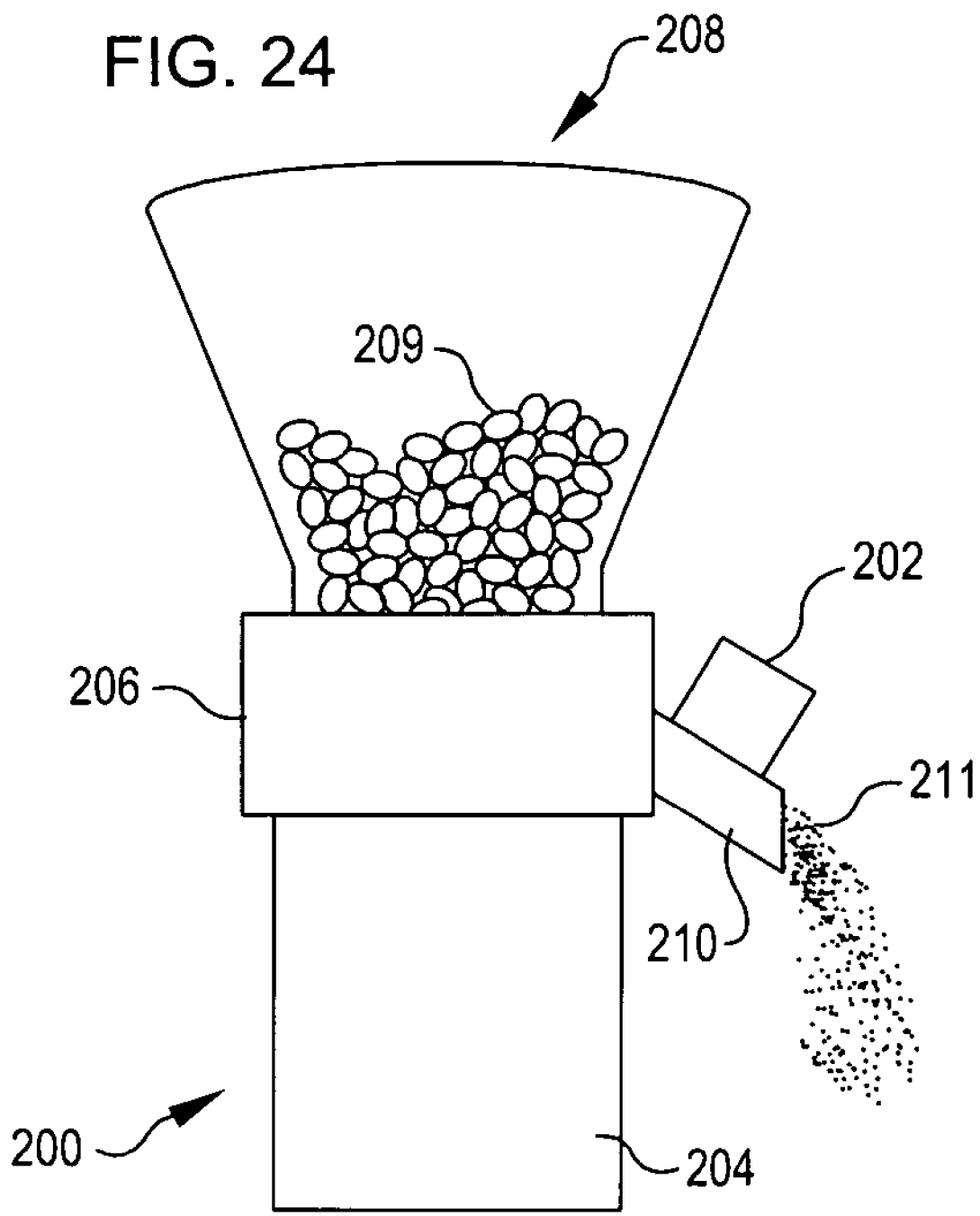
FIG. 24 is a view of an optical coffee grinder that may be used in conjunction with the beverage-brewing machine of FIGS. 3 and 23 according to an embodiment of the invention.

FIG. 24 is a view of a coffee grinder 200 having an optical coffee measuring unit 202 according to an embodiment of the invention.

In addition to the measuring unit 202, the coffee grinder 200 includes a motor 204, a grind head 206, a whole-coffee inlet 208 for receiving coffee beans 209, and a transparent ground-coffee outlet 210 through which the grind head discharges ground coffee 211.

The measuring unit 202 may include a pixel array, an illumination source such as a light-emitting diode (LED) or semiconductor laser, a processor (none of these components shown in FIG. 24) and other components. These components may be off-the-shelf parts that are also used in optical computer mice.

In operation, one loads the coffee beans 209 into the inlet 208, and the grind head 206 grinds the beans and provides the ground coffee 211 via the outlet 210.

As the ground coffee 211 passes through the transparent outlet 210, the measuring unit 202 takes pictures of the ground coffee at periodic intervals. By analyzing these pictures using one or more image-analysis techniques, the unit 202 can determine the amount of ground coffee 211 that passes through the outlet 210. Specifically, the unit 202 searches for motion vectors between successive images, and determines the two-dimensional flow rate of the coffee 211 from these vectors. The unit 202 then determines the volumetric flow rate through the outlet 210 by multiplying the two-dimensional flow rate and the cross-sectional area of the outlet. Alternatively, the unit 202 may determine only a one-dimensional flow rate (in a direction away from the coffee grinder 200) and determine the volumetric flow rate through the outlet 210 by multiplying the one-dimensional flow rate and the cross-sectional area of the outlet.

Still referring to FIG. 24, alternate embodiments of the measuring unit 202 are contemplated. For example, although described as measuring ground coffee 211, the unit 202 may be used to measure other substances. Furthermore, although described as being incorporated in a stand-alone coffee grinder, the unit 202 may be incorporated in the machine 30 or an automatic coffee brewer such as described in International Application No. PCT/US2006/013930 filed on Apr. 11, 2006, which was previously incorporated by reference.

From the foregoing it will be appreciated that, although specific embodiments have been described herein for purposes of illustration, various modifications may be made without deviating from the spirit and scope of the invention. Furthermore, where an alternative is disclosed for a particular embodiment, this alternative may also apply to other embodiments even if not specifically stated.

What is claimed is:

1. A machine for brewing a beverage, the machine comprising:
   a chamber operable to receive a liquid and a flavor base and to allow the beverage to brew; and
   a piston assembly disposed within the chamber and operable to
       filter a solid from the brewed beverage by moving in a first direction, and
       dispense the filtered beverage from the machine by moving in a second direction.

2. The machine of claim 1, further comprising a controller operable to control the movement of the piston assembly.

3. The machine of claim 1 wherein the chamber and the piston assembly are cylindrical.

4. The machine of claim 1 wherein:
   the chamber has an end and a beverage-dispensing conduit disposed in the end;
   the piston assembly moves away from the chamber end while moving in the first direction; and
   the piston assembly moves toward the chamber end while moving in the second direction.

5. The machine of claim 1 wherein:
   the chamber has a bottom and a beverage-dispensing conduit disposed in the bottom;
   the piston assembly moves away from the chamber bottom while moving in the first direction; and the piston assembly moves toward the chamber bottom while moving in the second direction.

6. The machine of claim 1 wherein:
the flavor base comprises coffee grounds;
the liquid comprises water; and
the solid comprises spent coffee grounds.

7. The machine of claim 1 wherein the piston assembly comprises a filter assembly that is operable to:
filter the flavor base from the brewed beverage by passing the brewed beverage from a first portion of the chamber on a first side of the piston assembly to a second portion of the chamber on a second side of piston assembly and by preventing passage of the solid from the first chamber portion to the second chamber portion as the piston assembly moves in the first direction, and
dispense the filtered beverage by preventing passage of the filtered beverage from the second chamber portion to the first chamber portion as the piston assembly moves in the second direction.

8. The machine of claim 1 wherein the piston assembly comprises:
a filter assembly; and
a valve that is operable to
allow the brewed beverage to pass through the filter assembly as the piston assembly moves in the first direction; and
prevent the filtered beverage from passing through the filter assembly as the piston assembly moves in the second direction.

9. The machine of claim 1, further comprising a reservoir operable to hold the liquid, to heat the liquid to a predetermined temperature, and to provide the heated liquid to the chamber.

10. The machine of claim 1, further comprising:
a reservoir operable to hold the liquid and to heat the liquid to a first predetermined temperature; and
a temperature-control unit operable to receive the heated liquid from the reservoir, to change the temperature of the liquid from the first predetermined temperature to a second predetermined temperature, and to provide the liquid having the second predetermined temperature to the chamber.

11. The machine of claim 1, further comprising:
a reservoir operable to hold the liquid and to heat the liquid to a first predetermined temperature; and
a temperature-control unit operable to receive the heated liquid from the reservoir, to cool the liquid to a second predetermined temperature, and to provide the cooled liquid to the chamber.

12. The machine of claim 1, further comprising:
a holder operable to hold a beverage cup; and
wherein the piston assembly is operable to dispense the beverage into the cup.

13. The machine of claim 1, further comprising:
a holder operable to hold a beverage cup;
a sensor operable to indicate whether the beverage cup is in the holder; and
wherein the piston assembly is operable to force the beverage out of the chamber and into the beverage cup if the sensor indicates that the cup is in the holder.

14. The machine of claim 1, further comprising:
wherein the chamber has a wall; and
a heating assembly coupled to the wall and operable to maintain the wall at a predetermined temperature.

15. The machine of claim 1, further comprising:
wherein the chamber has an opening;
a substantially flat surface contiguous with the opening; and
wherein the piston assembly has a surface and is operable to move into a wipe position where the piston-assembly surface is substantially coplanar with the contiguous surface.

16. The machine of claim 1, further comprising:
wherein the chamber has an opening;
a substantially flat surface contiguous with the opening;
wherein the piston assembly has a surface; and
wherein after dispensing the beverage the piston assembly is operable to move into a wipe position where the piston-assembly surface is substantially coplanar with the contiguous surface.

17. The machine of claim 1, further comprising:
wherein the chamber has an opening;
a substantially flat surface contiguous with the opening;
wherein the piston assembly has a surface; and
wherein after filtering the beverage but before dispensing the beverage the piston assembly is operable to move into a wipe position where the piston-assembly surface is substantially coplanar with the contiguous surface.

18. The machine of claim 1, further comprising:
wherein the chamber has an opening; and
a nozzle disposed outside of the chamber adjacent to the opening and operable to provide the liquid to the chamber.

19. The machine of claim 1, further comprising:
wherein the chamber has a wall; and
an opening in the chamber wall operable to provide the liquid to the chamber.

20. The machine of claim 1, wherein the second direction is opposite to the first direction.

21. A machine for brewing a beverage, the machine comprising:
a brew chamber; and
a piston assembly slideably disposed within the chamber and including
a filter assembly having a plurality of filter layers, and
a filter base plate including one or more openings for respectively receiving one or more one-way valves, wherein the filter assembly is coupled to the filter base plate.

22. The machine of claim 21, wherein the one or more valves comprises one or more check valves.

23. The machine of claim 21, wherein each of the one or more valves is flexible.

24. A method, comprising:
producing a beverage in a chamber from a flavor base and a liquid;
filtering a solid from the beverage by moving a piston in a first direction within the chamber; and
dispensing the filtered beverage by moving the piston in a second direction within the chamber.

25. The method of claim 24 wherein producing the beverage comprises brewing coffee in the chamber from ground coffee and water.

26. The method of claim 24 wherein the solid comprises residual flavor base.

27. The method of claim 24 wherein producing the beverage comprises:
introducing the flavor base into the chamber;
introducing the liquid into the chamber; and
stirring the liquid containing the flavor base.

28. The method of claim 24, further comprising wiping a solid residue from the piston into a waste-disposal unit after dispensing the beverage.

29. The method of claim 24, further comprising wiping a solid residue from the piston into a waste-disposal unit after filtering but before dispensing the beverage.

30. The method of claim 24, further comprising:
receiving a beverage-producing parameter; and
producing the beverage according to the parameter.

31. The method of claim 24, further comprising:
electronically receiving a beverage-producing parameter; and
producing the beverage according to the parameter.

32. A machine for brewing a beverage, the machine comprising:
a chamber operable to receive a liquid and a flavor base and to allow the beverage to brew, the chamber having an end and a beverage-dispensing conduit disposed at least in part in the end; and
a piston assembly disposed within the chamber and operable to:
filter a solid from the brewed beverage by moving in a first direction; and
force the filtered beverage out of the chamber by moving in a second direction,
wherein the piston assembly moves away from the chamber end while moving in the first direction, and
wherein the piston assembly moves toward the chamber end while moving in the second direction.

33. A machine for brewing a beverage, the machine comprising:
a chamber operable to receive a liquid and a flavor base and to allow the beverage to brew, the chamber having a bottom and a beverage-dispensing conduit disposed at least in part in the bottom; and
a piston assembly disposed within the chamber and operable to:
filter a solid from the brewed beverage by moving in a first direction; and
force the filtered beverage out of the chamber by moving in a second direction,
wherein the piston assembly moves away from the chamber bottom while moving in the first direction, and
wherein the piston assembly moves toward the chamber bottom while moving in the second direction.

34. A machine for brewing a beverage, the machine comprising:
a chamber operable to receive a liquid and a flavor base and to allow the beverage to brew;
a piston assembly disposed within the chamber and operable to:
filter a solid from the brewed beverage by moving in a first direction; and
force the filtered beverage out of the chamber by moving in a second direction; and
a reservoir operable to hold the liquid, to heat the liquid to a predetermined temperature, and to provide the heated liquid to the chamber.

35. A machine for brewing a beverage, the machine comprising:
a chamber operable to receive a liquid and a flavor base and to allow the beverage to brew;
a piston assembly disposed within the chamber and operable to:
filter a solid from the brewed beverage by moving in a first direction; and
force the filtered beverage out of the chamber by moving in a second direction;
a reservoir operable to hold the liquid and to heat the liquid to a first predetermined temperature; and
a temperature-control unit operable to receive the heated liquid from the reservoir, to change the temperature of the liquid from the first predetermined temperature to a second predetermined temperature, and to provide the liquid having the second predetermined temperature to the chamber.

36. A machine for brewing a beverage, the machine comprising:
a chamber operable to receive a liquid and a flavor base and to allow the beverage to brew;
a piston assembly disposed within the chamber and operable to:
filter a solid from the brewed beverage by moving in a first direction; and
force the filtered beverage Out of the chamber by moving in a second direction;
a reservoir operable to hold the liquid and to heat the liquid to a first predetermined temperature; and
a temperature-control unit operable to receive the heated liquid from the reservoir, to cool the liquid to a second predetermined temperature, and to provide the cooled liquid to the chamber.

37. A machine for brewing a beverage, the machine comprising:
a chamber operable to receive a liquid and a flavor base and to allow the beverage to brew;
a piston assembly disposed within the chamber and operable to:
filter a solid from the brewed beverage by moving in a first direction; and
force the filtered beverage out of the chamber by moving in a second direction; and
a holder operable to hold a beverage cup,
wherein the piston assembly is operable to dispense the beverage into the cup.

38. A machine for brewing a beverage, the machine comprising:
a chamber operable to receive a liquid and a flavor base and to allow the beverage to brew;
a piston assembly disposed within the chamber and operable to:
filter a solid from the brewed beverage by moving in a first direction; and
force the filtered beverage out of the chamber by moving in a second direction;
a holder operable to hold a beverage cup;
a sensor operable to indicate whether the beverage cup is in the holder,
wherein the piston assembly is operable to force the beverage out of the chamber and into the beverage cup if the sensor indicates that the cup is in the holder.

39. A machine for brewing a beverage, the machine comprising:
a chamber operable to receive a liquid and a flavor base and to allow the beverage to brew, the chamber having a wall;
a piston assembly disposed within the chamber and operable to:
filter a solid from the brewed beverage by moving in a first direction; and
force the filtered beverage out of the chamber by moving in a second direction; and
a heating assembly coupled to the wall and operable to maintain the wall at a predetermined temperature.

40. A machine for brewing a beverage, the machine comprising:
- a chamber operable to receive a liquid and a flavor base and to allow the beverage to brew, the chamber having an opening;
- a piston assembly disposed within the chamber and operable to:
  - filter a solid from the brewed beverage by moving in a first direction; and
  - force the filtered beverage out of the chamber by moving in a second direction; and
- a substantially flat surface contiguous with the opening,
- wherein the piston assembly has a surface and is operable to move into a wipe position where the piston assembly surface is substantially coplanar with the contiguous surface.

41. A machine for brewing a beverage, the machine comprising:
- a chamber operable to receive a liquid and a flavor base and to allow the beverage to brew, the chamber having an opening;
- a piston assembly disposed within the chamber and operable to:
  - filter a solid from the brewed beverage by moving in a first direction; and
  - force the filtered beverage out of the chamber by moving in a second direction; and
- a substantially flat surface contiguous with the opening,
- wherein the piston assembly has a surface, and
- wherein after forcing the beverage out of the chamber the piston assembly is operable to move into a wipe position where the piston assembly surface is substantially coplanar with the contiguous surface.

42. A machine for brewing a beverage, the machine comprising:
- a chamber operable to receive a liquid and a flavor base and to allow the beverage to brew, the chamber having an opening;
- a piston assembly disposed within the chamber and operable to:
  - filter a solid from the brewed beverage by moving in a first direction; and
  - force the filtered beverage out of the chamber by moving in a second direction; and
- a substantially flat surface contiguous with the opening,
- wherein the piston assembly has a surface, and
- wherein after filtering the beverage but before forcing the beverage out of the chamber the piston assembly is operable to move into a wipe position where the piston assembly surface is substantially coplanar with the contiguous surface.

43. A machine for brewing a beverage, the machine comprising:
- a chamber operable to receive a liquid and a flavor base and to allow the beverage to brew, the chamber having an opening;
- a piston assembly disposed within the chamber and operable to:
  - filter a solid from the brewed beverage by moving in a first direction; and
  - force the filtered beverage out of the chamber by moving in a second direction; and
- a nozzle disposed outside of the chamber adjacent to the opening and operable to provide the liquid to the chamber.

44. A machine for brewing a beverage, the machine comprising:
- a chamber operable to receive a liquid and a flavor base and to allow the beverage to brew, the chamber having a wall;
- a piston assembly disposed within the chamber and operable to:
  - filter a solid from the brewed beverage by moving in a first direction; and
  - force the filtered beverage out of the chamber by moving in a second direction; and
- an opening in the chamber wall operable to provide the liquid to the chamber.

45. A machine for brewing a beverage, the machine comprising:
- a chamber operable to receive a liquid and a flavor base and to allow the beverage to brew; and
- a piston assembly disposed within the chamber and operable to:
  - filter a solid from the brewed beverage by moving in a first direction; and
  - force the filtered beverage out of the chamber by moving in a second direction,
- wherein the second direction is opposite to the first direction.

46. A machine for brewing a beverage, the machine comprising:
- a brew chamber; and
- a piston assembly slideably disposed within the chamber and including
  - a filter assembly, and
  - a one-way valve, wherein the valve is flexible.

* * * * *

UNITED STATES PATENT AND TRADEMARK OFFICE
CERTIFICATE OF CORRECTION

PATENT NO.       : 7,673,555 B2
APPLICATION NO.  : 11/525251
DATED            : March 9, 2010
INVENTOR(S)      : Nosler et al.

It is certified that error appears in the above-identified patent and that said Letters Patent is hereby corrected as shown below:

On the Title Page, item (60): Related U.S. Application Data, please delete "Provisional application No. 60/670,955, filed on Apr. 11, 2005, provisional" and insert --Provisional--, therefor.

Col. 1, Line 63, please delete "Hasted et al." and insert --Husted et al.--, therefor.

Col. 18, Line 46, please delete "top-of" and insert --top of--, therefor.

Col. 24, Line 19, please delete "Out" and insert --out--, therefor.

Signed and Sealed this

Twelfth Day of October, 2010

David J. Kappos
*Director of the United States Patent and Trademark Office*